United States Patent
Peisa et al.

(10) Patent No.: US 9,591,518 B2
(45) Date of Patent: Mar. 7, 2017

(54) METHOD AND APPARATUS FOR NON-ACCESS STRATUM SIGNALING

(71) Applicant: Telefonaktiebolaget L M Ericsson (publ), Stockholm (SE)

(72) Inventors: Janne Peisa, Espoo (FI); Magnus Stattin, Sollentuna (SE); Mattias Tan Bergström, Stockholm (SE); Oumer Teyeb, Solna (SE); Yu Wang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 48 days.

(21) Appl. No.: 14/758,254

(22) PCT Filed: Jan. 2, 2014

(86) PCT No.: PCT/SE2014/050003
§ 371 (c)(1),
(2) Date: Jun. 29, 2015

(87) PCT Pub. No.: WO2014/107135
PCT Pub. Date: Jul. 10, 2014

(65) Prior Publication Data
US 2015/0334597 A1    Nov. 19, 2015

Related U.S. Application Data

(60) Provisional application No. 61/749,501, filed on Jan. 7, 2013.

(51) Int. Cl.
*H04W 28/02*     (2009.01)
*H04W 28/08*     (2009.01)
(Continued)

(52) U.S. Cl.
CPC ....... *H04W 28/0289* (2013.01); *H04W 28/08* (2013.01); *H04W 36/0011* (2013.01);
(Continued)

(58) Field of Classification Search
CPC ......... H04W 8/02; H04W 8/08; H04W 8/087; H04W 28/0289; H04W 28/08;
(Continued)

(56) References Cited

FOREIGN PATENT DOCUMENTS

| GB | 2491049 A | 11/2012 |
|---|---|---|
| WO | 2004032535 A2 | 4/2004 |

(Continued)

OTHER PUBLICATIONS

3GPP, "3rd Generation Partnership Project; Technical Specification Group Core Network and Terminals; Non-Access-Stratum (NAS) protocol for Evolved Packet System (EPS); Stage 3 (Release 12)", 3GPP TS 24.301 V11.2.0, Mar. 2012, 1-327.

(Continued)

*Primary Examiner* — Timothy J Weidner
(74) *Attorney, Agent, or Firm* — Murphy, Bilak & Homiller, PLLC

(57) ABSTRACT

For a targeted wireless device that is operating in a communication network that includes a first access network and an associated core network, the teachings herein advantageously provide for the conditional selection of a second access network, for exchanging NAS signaling between the communication network and a targeted wireless device, to offload such signaling from the first access network. The second access network is different from the first access network and may or may not be integrated with the core network, but the first access network and/or the associated core network are adapted to provide for the conditional routing of certain NAS signaling through the second access network, which NAS signaling would conventionally be
(Continued)

conveyed via the first access network. In an example, the first access network is a 3GPP RAN and the core network is a 3GPP core network, while and the second access network is a non-3GPP RAN.

19 Claims, 11 Drawing Sheets

(51) Int. Cl.
    *H04W 40/36* (2009.01)
    *H04W 48/18* (2009.01)
    *H04W 76/04* (2009.01)
    *H04W 88/06* (2009.01)
    *H04W 36/00* (2009.01)
    *H04W 8/02* (2009.01)
    *H04W 36/14* (2009.01)
    *H04W 36/22* (2009.01)
    *H04W 60/00* (2009.01)

(52) U.S. Cl.
    CPC .......... *H04W 40/36* (2013.01); *H04W 48/18* (2013.01); *H04W 76/04* (2013.01); *H04W 88/06* (2013.01); *H04W 8/02* (2013.01); *H04W 36/14* (2013.01); *H04W 36/22* (2013.01); *H04W 60/005* (2013.01)

(58) Field of Classification Search
    CPC ......... H04W 36/0005; H04W 36/0011; H04W 36/14; H04W 36/22; H04W 40/36; H04W 48/18; H04W 48/20; H04W 60/005; H04W 76/04; H04W 88/005; H04W 88/06
    See application file for complete search history.

(56) References Cited

FOREIGN PATENT DOCUMENTS

| WO | 2012138760 A1 | 10/2012 |
| WO | 2012172397 A2 | 12/2012 |
| WO | 2012177023 A1 | 12/2012 |
| WO | 2013026873 A1 | 2/2013 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.1.0, Mar. 2012, 1-194.

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.1.0, Sep. 2012, 1-325.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.3.0, Dec. 2012, 1-302.

3GPP, "3rd Generation Partnership Project; Technical Specification Group Services and System Aspects; Network architecture (Release 12)", 3GPP TS 23.002 V12.3.0, Dec. 2013, 1-105, Oct. 12, 2016.

Aboba, B. et al., "Extensible Authentication Protocol (EAP)", Network Working Group, Request for Comments: 3748, The Internet Society, Jun. 2004, 1-67.

Aboba, B. et al., "Extensible Authentication Protocol (EAP) Key Management Framework", Network Working Group, Request for Comments: 5247, The Internet Society, Aug. 2008, 1-79.

METHOD AND APPARATUS FOR NON-ACCESS STRATUM SIGNALING

TECHNICAL FIELD

The present invention generally relates to communication networks, and particularly relates to Non-Access Stratum, NAS, signaling in communication networks.

BACKGROUND

Wireless communication networks based on the Long Term Evolution, LTE, specifications promulgated by the Third Generation Partnership Project, 3GPP, use an "Evolved Packet System" or EPS that includes an "Evolved Packet Core" or EPC, and an "Evolved UMTS Terrestrial Radio Access Network" or E-UTRAN. The interested reader may refer to the technical specification 3GPP TS 23.002 for an architectural overview of the EPC, and may refer to 3GPP TS 23.401 for EPC architectural details with respect to E-UTRAN access. Further, 3GPP TS 36.300 provides substantive details for the E-UTRAN.

For purposes of this discussion, it is sufficient to note that the E-UTRAN includes base stations referred to as enhanced NodeBs, which are also known as eNBs or eNodeBs. The eNBs provide the E-UTRA user-plane and control-plane protocol terminations towards the user equipments, UEs, operating in the network. The eNBs interconnect with each other through an "X2" interface, and interconnect with the EPC through an "S1" interface. More specifically, the eNBs interconnect to Mobility Management Entities or MMEs in the EPC by means of an S1-MME interface and to Serving Gateways or S-GWs in the EPC by means of an S1-U interface. The S1 interface supports many-to-many relations between given eNBs and respective SGWs and MMEs within the EPC.

An MME in the EPC operates as a control node and in that role it processes signaling between a UE and the EPC. Primary functions of the MME relate to connection management and bearer management, which are handled via Non Access Stratum, NAS, protocols. In particular, the NAS protocols support mobility and session management procedures for UEs operating in an LTE network. The NAS protocols form the highest stratum of the control plane between a UE and the EPC, which may be referred to more simply as a core network or CN. According to TS 24.301, NAS signaling connections are peer-to-peer S1 mode connections between UEs and MMEs, but this connection includes a Radio Resource Control, RRC, connection with the UE via the LTE air interface in the E-UTRAN, denoted as the "LTE-Uu" interface, along with a corresponding S1AP connection via the S1 interface.

While TS 24.301 provides a detailed presentation of the NAS protocols, it is useful here to note that the main functions of the NAS are the support of mobility and session management procedures for UEs, e.g., to establish and maintain Internet Protocol, IP, connectivity between a UE and a Packet Data Network Gateway, P-GW, in the CN. According to this broad functional understanding, the NAS protocols divide into categories; namely EPS Mobility Management protocols, referred to as EMM protocols, and EPS Session Management protocols, referred to as ESM protocols.

IP connectivity between a UE and a PDN is based on a PDN connection, i.e., through an S-GW and P-GW of the EPC, and an EPS bearer supported by the E-UTRAN air interface. The ESM protocols support network-initiated EPS bearer procedures, including activation, deactivation and modification. Further, the ESM protocols support UE-initiated transaction procedures, including PDN connection establishment and disconnection requests, bearer resource allocation and modification requests, and bearer release requests.

The EMM protocols include EMM common procedures, EMM specific procedures, and EMM connection management procedures. The EMM connection management procedures provide various functionality, including: network-initiated paging to indicate a NAS service request to a UE, UE-initiated service requests to initiate a NAS signaling connection, and the transport of various NAS messages. The EMM common procedures are network-initiated and include a number of functions, such as these items: reallocation of Global Unique Temporary IDs, security mode control, and authentication.

In contrast, the EMM specific procedures are UE-initiated and include attach/detach procedures, for attaching and detaching from the EPC. The EMM specific procedures also provide tracking functionality, wherein the EPC maintains an awareness of the locations of idle-mode UEs within the network. The tracking functionality is based on the network being divided into Tracking Areas, where different subsets of cells or eNBs in the E-UTRAN and associated subsets of MMEs and S-GWs represent different Tracking Areas. When a UE detects that it has entered a new Tracking Area, it sends a Tracking Area Update, TAU, message to the network. TAU messages may also be sent on a periodic basis, according to a TAU timer.

The attach, detach and TAU procedures, along with certain other NAS procedures, are performed for the purpose of exchanging specific information between the UE and the EPC, and are not followed by any other NAS or user plane procedures. Such NAS procedures generate a considerable amount of signaling traffic and consume battery life at the UE. Certain steps have been taken to reduce the amount of this type of NAS signaling going between individual UEs and the EPC. For example, a UE may be provisioned with a Tracking Area Indicator, TAI, list. In turn, the UE performs a TAU procedure only when it enters a cell that is identified as being in a Tracking Area not in its TAI list. Another method aimed at reducing the amount of such NAS signaling combines tracking area updates and location area updates.

However, certain trends in network design, deployment and usage result in networks with increasing numbers of cells and increasing numbers of UEs or other wireless devices, which in turn means more NAS signaling will be required more frequently. Examples of these trends include the proliferation of wireless devices, both in the consumer and industrial markets, and particularly the emergence of machine-type devices that use wireless communication networks for conveying Machine Type Communications between the machine-type devices and their respective Machine-to-Machine, M2M, service-provider networks.

Another example trend is network "densification," which is based on using denser arrangements of network base stations, to improve coverage and increase data rates. The increasing use of "heterogeneous" networks represents another example trend. Heterogeneous networks are economically attractive as compared to network densification, which improves coverage simply by adding more wide-area base stations. In contrast, heterogeneous networks improve coverage and/or provider higher-date rate services based on adding additional access points that typically are lower-power and lower-complexity as compared to the "normal"

network base station or access points used to provide wide-area cellular radio connectivity.

In an example heterogeneous network, one or more macro or large area cells are overlaid with one or more smaller cells, often generically referred to as "pico" cells, to denote their relatively small coverage areas, as compared to the macro-cell coverage areas. The pico cells may be used as hotspots that provide higher data rate service and/or may be used to extend the macro-cell coverage areas or to fill in macro-cell coverage gaps. Other pico cells may operate with closed subscriber groups, such as Home eNBs. More generally, a heterogeneous network includes a mix of base station or access point types, where the access point types may be distinguished by any one or more of: different access point powers and/or corresponding cell sizes, and different Radio Access Technologies or RATs.

For example, it is known to have a 3GPP Radio Access Network, RAN, such as the LTE E-UTRAN, overlaid with a non-3GPP RAN, such as provided by one or more Wi-Fi networks. The 3GPP RAN may be regarded as first access network that is directly coupled to and coordinated with the core network, while the Wi-Fi network(s) may be regarded as a second access network that may or may not having any integration with the core network.

SUMMARY

For a targeted wireless device that is operating in a communication network that includes a first access network and an associated core network, the teachings herein advantageously provide for the conditional selection of a second access network, for exchanging NAS signaling between the communication network and a targeted wireless device. Conditional use of the second access network offloads such signaling from the first access network. The second access network is different from the first access network and may or may not be integrated with the core network, but a network node in the first access network and/or the associated core network is configured to conditionally rout certain NAS signaling through the second access network, which NAS signaling would conventionally be conveyed via the first access network. In an example, the first access network is a 3GPP RAN and the core network is a 3GPP core network, while the second access network is a non-3GPP RAN, such as a Wi-Fi network.

An example implementation on the network side comprises a method of NAS signaling at a network node that is configured for operation in a communication network that includes a core network and a first access network. The method includes conditionally selecting a second access network for exchanging NAS signaling between the communication network and a targeted wireless device. Here, the second access network is different from the first access network and the NAS signaling relates to mobility management or session management of the targeted wireless device with respect to the communication network, including the first access network. In this context, the method includes exchanging the NAS signaling with the targeted wireless device via the second access network, when the second access network is selected, and exchanging the NAS signaling with the targeted wireless device via the first access network, when the second access network is not selected.

In a related example, a network node is configured for operation in a communication network that includes a core network and a first access network. In one implementation, the communication network is a Third Generation Partnership Project, 3GPP, network, where the core network is a 3GPP core network and the first access network is an associated 3GPP RAN. The network node may be implemented in the RAN, e.g., integrated in or associated with a 3GPP base station in the RAN, or may be implemented in the core network, e.g., integrated in or associated with a core network node, such as a Mobility Management Entity.

Regardless of its particular location, the network node in an example embodiment includes a first communication interface configured for exchanging NAS signaling between the communication network and a targeted wireless device via the first access network, wherein the NAS signaling relates to mobility management or session management of the targeted wireless device in the context of the first access network. The network node further includes a second communication interface configured for exchanging the NAS signaling between the communication network and the targeted device via a second access network that is different from the first access network. The network node further includes a processing circuit operatively associated with the first and second communication interfaces.

The processing circuit is configured to conditionally select the second access network for exchanging the NAS signaling between the communication network and the targeted wireless device, and to exchange the NAS signaling with the targeted wireless device via the second access network, when the second access network is selected. The processing circuit is further configured to exchanging the NAS signaling with the targeted wireless device via the first access network, when the second access network is not selected.

In a further aspect of the network-side teachings, it is contemplated herein to support the conditional use of the second access network for the exchange of NAS signaling between a communication network and a targeted wireless device via a NAS server that is configured for operation in the communication network, which communication network includes a first access network and a core network. The NAS server in an example embodiment includes a communication interface configured for conveying NAS signaling exchanged between the communication network and the targeted wireless device via a second access network that is different than the first access network, and further includes one or more processing circuits that are operatively associated with the communication interface.

The one or more processing circuits are configured to forward incoming NAS signaling, as sent from the targeted wireless device via the second access network, to a targeted network node within the first access network or within the core network. This forwarding is based on reading a node identifier included in the incoming NAS signaling. Correspondingly, the one or more processing circuits are configured to forward outgoing NAS signaling, as sent from the network node for conveyance to the targeted wireless device via the second access network, towards the targeted wireless device via the second access network. This forwarding of outgoing NAS signaling is based the NAS server maintaining a mapping between an identity of the targeted wireless device in the communication network and a routing address of the targeted wireless device in the second access network.

As for device-side teachings, one embodiment comprises a method of processing NAS signaling in a wireless device that is operating in a communication network comprising a first access network and a core network. The method includes receiving incoming NAS signaling via a second access network that is different than the first access network but is communicatively linked directly or indirectly to the communication network. Here, the incoming NAS signaling relates to mobility management or session management of the targeted wireless device with respect to the first access network. The method includes extracting an incoming NAS message from the incoming NAS signaling and passing the incoming NAS message to a NAS processing layer of the wireless device, and processing the incoming NAS message via the NAS processing layer.

In a corresponding example embodiment, a wireless device is configured for operation in a communication network comprising a first access network and a core network. The wireless device includes a first communication interface that is configured for operation with the first access network, and a second communication interface that is configured for operation with a second access network that is different than the first access network. The example wireless device further includes one or more processing circuits that are operatively associated with the first and second communication interfaces.

The one or more processing circuits are configured to receive incoming NAS signaling via the second access network, wherein the incoming NAS signaling relates to mobility management or session management of the targeted wireless device with respect to the first access network. For example, the NAS signaling involves session and/or mobility-management procedures that involve the first access network with regard to bearers and/or with regard to tracking, location, or routing areas. The one or more processing circuits are further configured to extract an incoming NAS message from the incoming NAS signaling and pass the incoming NAS message to a NAS processing layer of the wireless device, as implemented in the one or more processing circuits, and to process the incoming NAS message via the NAS processing layer.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
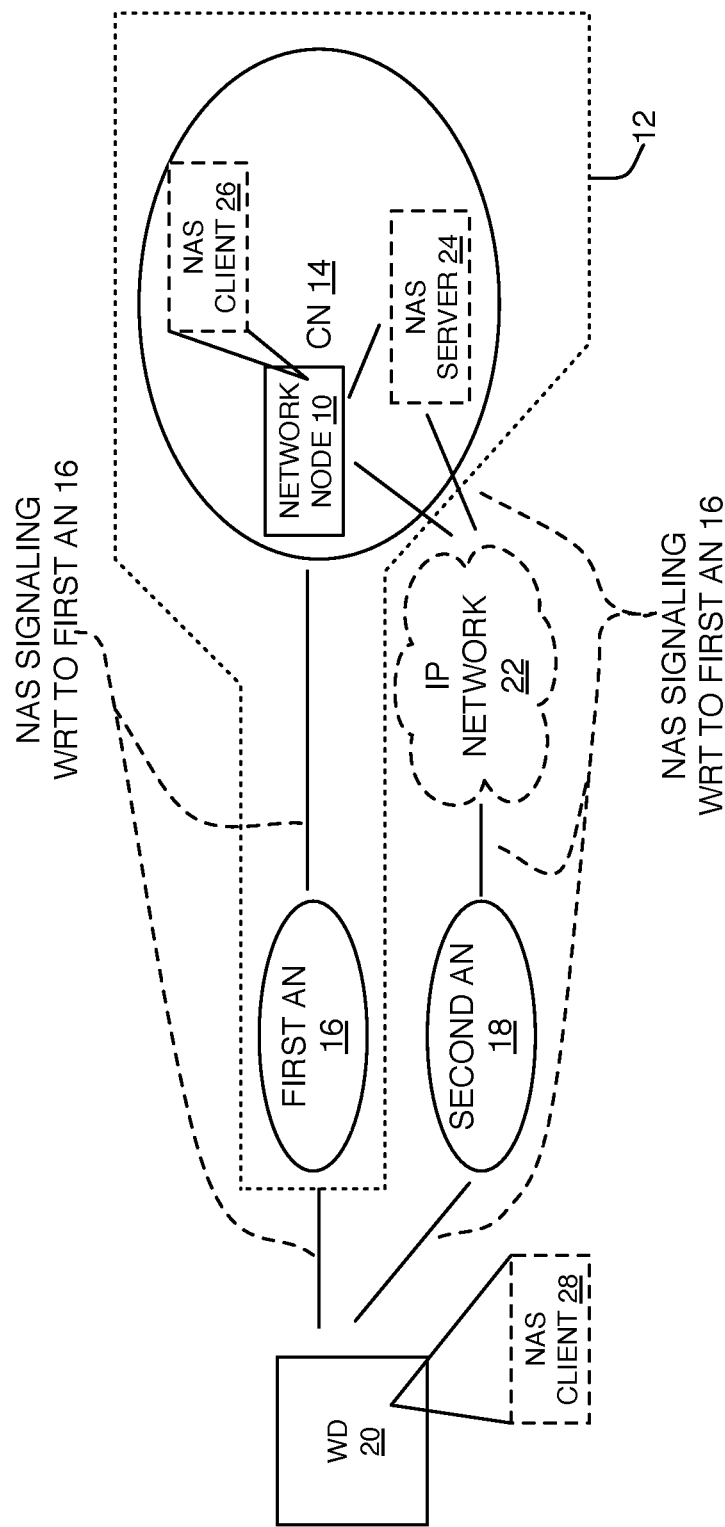
FIG. 1 is a block diagram of one embodiment of a communication network configured for NAS signaling according to the teachings herein.

FIG. 1 illustrates a communication network node 10 that is configured for operation in a communication network 12 that includes a core network 14, abbreviated as "CN 14", and further includes a first access network 16, abbreviated as "first AN 16". The network node 10 is advantageously configured to conditionally select a second access network 18, shown as "second AN 18", for use in exchanging certain NAS signaling between the communication network 12 and a targeted wireless device 20, shown as "WD 20" in the diagram. That is, for at least some NAS signaling that would conventionally be conveyed via the first AN 16, the network node 10 conditionally uses the second AN 18 to convey such signaling, thereby offloading that signaling from the first AN 16.

Accordingly, the diagram depicts the exchange of NAS signaling between the wireless device 20 and the communication network 12, where that signaling is denoted as being exchanged with respect to the first AN 16—where "WRT" denotes "with respect to". Such signaling may be conveyed conventionally using the first AN 16 or, at least on a conditional basis, via the second AN 18, according to the teachings herein. Characterizing the subject NAS signaling as being with respect to the first AN 16 means that the NAS signaling implicates the first AN 16. Further, the depicted NAS signaling is not necessarily intended to indicate all of the NAS signaling that may be exchanged between the communication network 12 and the targeted wireless device 20. Rather, the NAS signaling that is exchanged with respect to the first AN 16 and that is of particular interest herein may be understood as NAS signaling relating to session management and mobility management procedures involving operation and/or movement of the targeted wireless device 20 in the communication network 12, including the first AN 16. Such procedures include, for example, bearer establishment or modification for the targeted wireless device 20 within the first AN 16, or tracking/location/routing area update procedures involving mobility of the targeted wireless device 20 the first AN 16, where different cells or subsets of cells in the first AN 16 map to different routing, tracking, or location areas defined for the communication network 12.

Thus, the NAS signaling at issue here is NAS signaling that would by convention be conveyed using the first AN 16, but according to the teachings herein is conditionally offloaded from the first AN 16 to the second AN 18. That offloading thereby shifts at least some of the NAS signaling burden from the first AN 16 to the second AN 18. In this regard, the second AN 18 is different from the first AN 16, and it directly or indirectly couples to the CN 14 via an Internet Protocol, IP, network 22. The second AN 18 may or may not have any integration with the communication network 12 and, in at least some embodiments, the second AN 18 uses a different Radio Access Technology, RAT, than is used by the first AN 16.

The first AN 16 includes at least one access point, e.g., a base station or other radio network node that provides an air interface for connecting with the wireless device 20. Likewise, the second AN 18 includes at least one access point that provides an air interface for connection with the wireless device 20.

In one example, the communication network 12 is a Third Generation Partnership Project, 3GPP, network, where the first AN 16 is a 3GPP Radio Access Network or RAN, and where the CN 14 is a 3GPP core network. In an example case, the communication network 12 is an LTE network, where the first AN 16 is an E-UTRAN, and where the CN 14 is an EPC. The second AN 18 is a Wi-Fi network or other such wireless access network, which may or may not have any affiliation with the communication network 12. Correspondingly, the wireless device 20 includes communication interfaces configured for operation with both the first AN 16 and the second AN 18, along with associated protocol processors to support overall communications processing within the context of both ANs 16 and 18, and the communication network 12 at large.

The contemplated conditional use of the second AN 18 for conveying certain NAS signaling exchanged between the wireless device 20 and the communication network 12 further involves, at least in some embodiments, a NAS server 24, which may be located in the CN 14. The NAS server 24 forwards incoming NAS signaling, as sent from the targeted wireless device 20 via the second access network 18, to the targeted network node 10 within the CN 14, or within the first AN 16, based on reading a node identifier included in the incoming NAS signaling. The NAS server 24 further forwards outgoing NAS signaling, as sent from the network node 10 for conveyance to a targeted wireless device 20 via the second AN 18, towards the targeted wireless device 20. The outgoing NAS signaling is forwarded via the second access network 18, based on the NAS server 24 maintaining a mapping between an identity of the targeted wireless device 20 in the communication network 12 and a routing address or other identifier of the targeted wireless device 20 in the second access network 18. The identity of the wireless device 20 with respect to the communication network 12 may be an IMSI or other unique identifier used by the communication network 12 for authentication and billing purposes.

Some or all of the functionality contemplated for the network node 10 may be implemented by way of a NAS client 26. For example, the NAS client 26 supports a number of functions contemplated herein, such as conditionally deciding between use of the first or second AN 16 or 18 for conveyance of the NAS signaling. The NAS client 26 also provides or uses a communication interface towards to the NAS server 24, e.g., for sending outgoing NAS signaling and for receiving incoming NAS signaling, as conveyed by the second AN 18. Similarly, the wireless device 20 implements a NAS client 28, which is configured to provide at least some of the device-side functionality contemplated herein for exchanging NAS signaling via the second AN 18.

Figure 2:
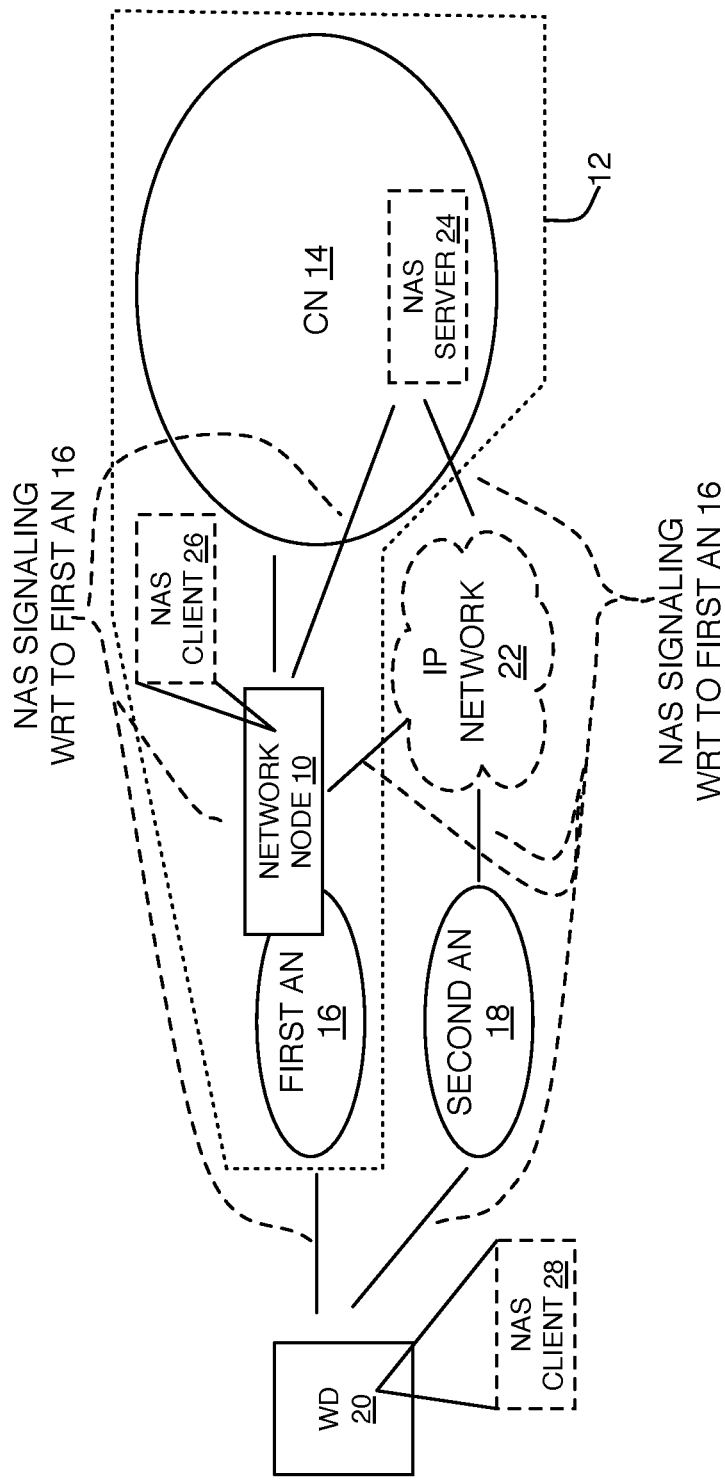
FIG. 2 is a block diagram of another embodiment of a communication network configured for NAS signaling according to the teachings herein.

The particular operation of the NAS clients 26 and 28 and, more generally, the specific operations of the wireless device 20, the network node 10, and the NAS server 24, depend to some extent on the location of the network node 10. In FIG. 1, the network node 10 is implemented in the CN 14, whereas in FIG. 2, the network node 10 is implemented in the first AN 16. In the first case, the network node 10 may be implemented in or in conjunction with a Mobility Management Entity, MME, or like node, e.g., a Mobile Switching Center, MSC. In the second case, the network node 10 may be implemented in or in conjunction with an access point in the first AN 16, such as in or with an eNB, where the first AN 16 is an LTE E-UTRAN.

Figure 3:
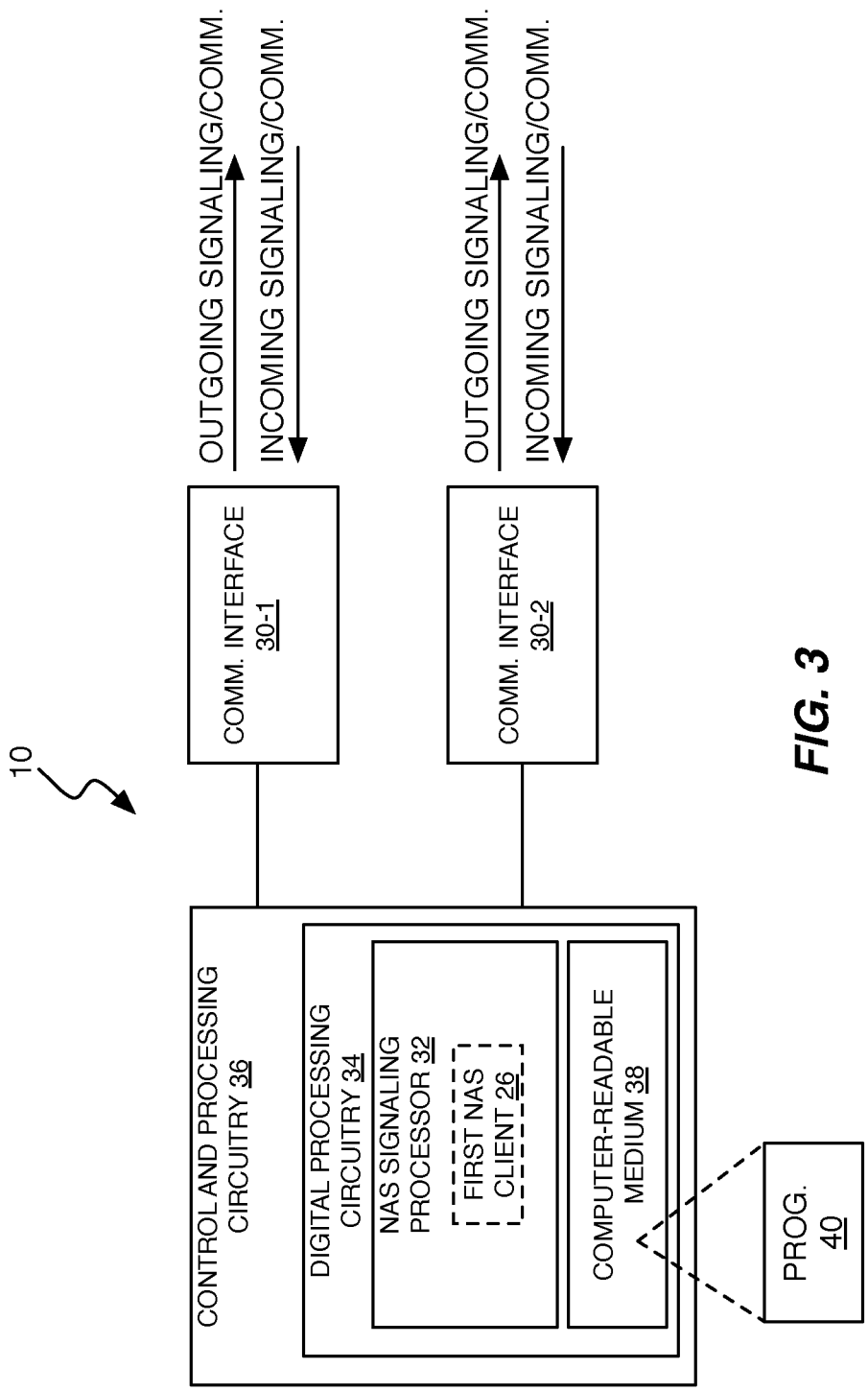
FIG. 3 is a block diagram of one embodiment of a network node configured for NAS signaling.

Either case is applicable to the embodiment of the network node 10 shown in FIG. 3. The network node 10 as shown in the diagram is configured for operation in a communication network 12 that includes a CN 14 and a first AN 16, and it comprises a first communication interface 30-1, a second communication interface 30-2, and a NAS signaling processor 32, which is implemented via digital processing circuitry 34 that, in turn, may comprise all or part of the control and processing circuitry 36 of the network node 10. The network node 10 further includes a computer-readable medium 38, which provides for non-transitory storage of a program 40 comprising computer program instructions that, when executed by the digital processing circuitry 36, configures the network node 10 according to the teachings herein.

The computer-readable medium 38 comprises, for example, EEPROM, FLASH, Solid-State Disk, SSD, or other non-volatile electronic storage medium. It will be understood that the network node 10 generally will further include working memory, such as Dynamic and/or Static RAM, to support live, ongoing operations. Further, those of ordinary skill in the art will appreciate that the network node 10 may be configured according to the teachings herein via fixed circuitry, via programmed circuitry, or via some combination of both. In the case where configuration of the network node 10 is based at least partially on programmatic configuration, the control and processing circuitry is specially adapted to perform the algorithms taught herein for the network node 10, based on the execution of stored computer program instructions embodying the contemplated node operations.

The first communication interface 30-1 is configured for exchanging NAS signaling between the communication network 12 and a targeted wireless device 20 via the first AN 16. Here, the NAS signaling relates to mobility management or session management of the targeted wireless device 20 with respect to the first access network 16—i.e., the mobility and/or session-management signaling involves the connectivity and/or movement of the wireless device 20 with respect to the communication network 12, including with respect to the first AN 16. Thus, such NAS signaling would conventionally be conveyed using the air interface provided by the first AN 16, but according to the teachings herein is conditionally offloaded to the second AN 18. Thus, the second communication interface 30-2 is configured for exchanging the NAS signaling between the communication network 12 and the targeted device via a second AN 18 that is different from the first AN 16.

In complementary fashion, the NAS signaling processor 32, which is also referred to simply as a "processing circuit 32", is operatively associated with the first and second communication interfaces 30-1 and 30-2 and is configured to: conditionally select the second AN 18 for exchanging the NAS signaling between the communication network 12 and the targeted wireless device 20; exchange the NAS signaling with the targeted wireless device 20 via the second AN 18, when the second AN 18 is selected; and exchange the NAS signaling with the targeted wireless device 20 via the first AN 16, when the second AN 18 is not selected. In this context, for example, the processing circuit 32 is configured to conditionally select the second AN 18 based on at least one of the following parameters: availability of the second AN 18 with respect to the targeted wireless device 20; an amount or type of the NAS signaling to be exchanged; a loading or activity level in the first AN 16 with respect to a cell or service area in the first AN 16 in which the targeted wireless device 20 is operating; and a device type of the targeted wireless device 20.

For example, the network node 10 does not even activate its "conditional usage" decision logic unless or until it knows, detects or otherwise learns that the second AN 18 is available to the wireless device 20. When the conditional decision logic is active, the second AN 18 may or may not be used for exchanging NAS signaling between the communication network 12 and the wireless device 20, in dependence on, e.g., whether the device 20 includes an appropriate NAS client 28 and/or on the particular amount and/or types of NAS signaling to be exchanged. In a particular example, the processing circuit 32 is configured to conditionally select the second AN 18 if the amount of the NAS signaling to be exchanged exceeds a defined amount, or if an activity or loading level of the first AN 16 exceeds a defined level in a cell or service area of the targeted wireless device 20.

The threshold used to decide whether the amount of NAS signaling is enough to trigger offloading the NAS signaling to the second AN 18 may be defined in terms of message size, byte count, etc. The threshold to decide whether the network loading in the first AN 16 is enough to trigger offloading the NAS signaling to the second AN 18 may be defined in terms of the number of wireless devices operating in that area of the first AN 16, the type of communication services active in that area, the average data throughput or percentage of network capacity in use in the area, etc. In general, such triggering operations favor offloading of the subject NAS signaling from the first AN 16 to the second AN 18 whenever there are significant amounts of NAS signaling to be exchanged and/or whenever the loading or activity level is high in the first AN 16, at least within the current cell or service area of the wireless device 20.

The processing circuit 32 is configured to select the second AN 18, regardless of the logical basis on which the second AN 18 is selected, by selecting the second communication interface 30-2 for use in exchanging the NAS signaling and by performing processing of the NAS signaling as needed for exchange via the second AN 18. The communication interfaces 30-1 and 30-2 in an example embodiment include physical circuitry and associated protocol processors, which may be programmatically configured elements of the control and processing circuitry 36, or which may be dedicated circuitry associated with the physical interface circuitry. Some elements may be shared between the two interfaces.

In at least one example, the network node 10 is configured to directly or indirectly couple to the second AN 18 through an IP network 22. Here, the processing circuit 32 is configured to exchange the NAS signaling with the targeted wireless device 20 via the second AN 18, based on being configured to: for first NAS signaling outgoing to the targeted wireless device 20, encapsulate the first NAS signaling into one or more outgoing IP packets addressed to the targeted wireless device 20; and for second NAS signaling incoming from the targeted wireless device 20, un-encapsulate the second NAS signaling from one or more incoming IP packets sent from the targeted wireless device 20.

The processing circuit 32 is, in other words, configured to package outgoing NAS signaling for transport as outgoing IP packets, and to un-package incoming IP packets, for extraction of the NAS signaling message(s) encapsulated therein. The outgoing IP packets may be "addressed" to the targeted wireless device 20, either based on the network node 10 obtaining the appropriate IP destination address for the targeted wireless device 20 and including that address in the outgoing IP packets, or may be based on the network node 10 including an identifier used to identify the targeted wireless device 20 in the communication network 12, for use by the NAS server 24 in mapping to the IP address of the wireless device 20 in the context of the second AN 18.

Figure 5:
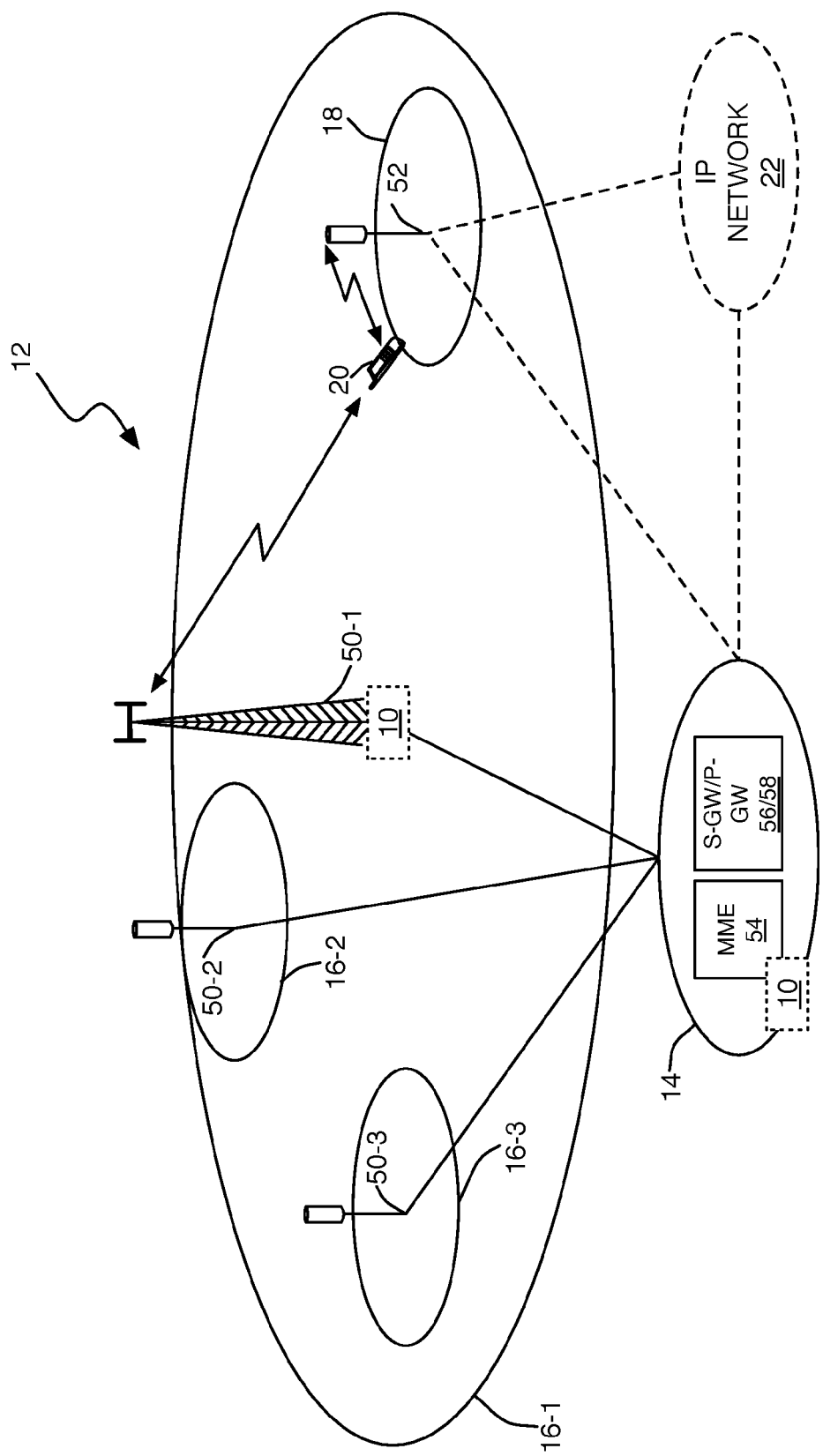
FIG. 5 is a block diagram of another embodiment of a communication network configured for NAS signaling according to the teachings herein.

In a particular example of this arrangement, the processing circuit 32 is configured to exchange the NAS signaling with the targeted wireless device 20 via the second AN 18, based on being configured to: communicate with a NAS server 24 in the communication network 12 via the second communication interface 30-2, to obtain an IP address associated with the targeted wireless device 20; encapsulate first NAS signaling outgoing to the targeted wireless device 20 into one or more outgoing IP packets addressed to the IP address; and transmit the one or more outgoing IP packets to the NAS server 24 via the second communication interface 30-2, for transport to an access point—e.g., access point 52 shown in FIG. 5—in the second AN 18 that is communicatively linked to the targeted wireless device 20. Alternatively, the IP packets outgoing from the network node 10 may include a network identifier of the targeted wireless device 20, which is then mapped by the NAS server 24 to the appropriate routing address of the targeted wireless device 20 within the context of the second AN 18.

In the same or another embodiment, the processing circuit 32 is configured to exchange the NAS signaling with the targeted wireless device 20 via the second AN 18, based on encrypting outgoing NAS signaling and sending the encrypted outgoing NAS signaling, and further based on decrypting incoming encrypted NAS signaling, and processing the decrypted incoming NAS signaling, or forwarding the decrypted incoming NAS signaling for processing. Thus, it should be understood that the NAS signaling as conveyed via the second AN 18 may or may not be transported in its "native" format—which can be understood as the format that would have been used for conventional conveyance of the NAS signaling via the first AN 16—in dependence on the nature of the second AN 18 and in dependence on whether or to what extent the second AN 18 has any integration with the communication network 12. For transport via the second AN 18 in a general example, the NAS signaling may be encapsulated and/or encrypted, and may be packaged into appropriate transmission units, e.g., into one or more IP packets.

Figure 4:
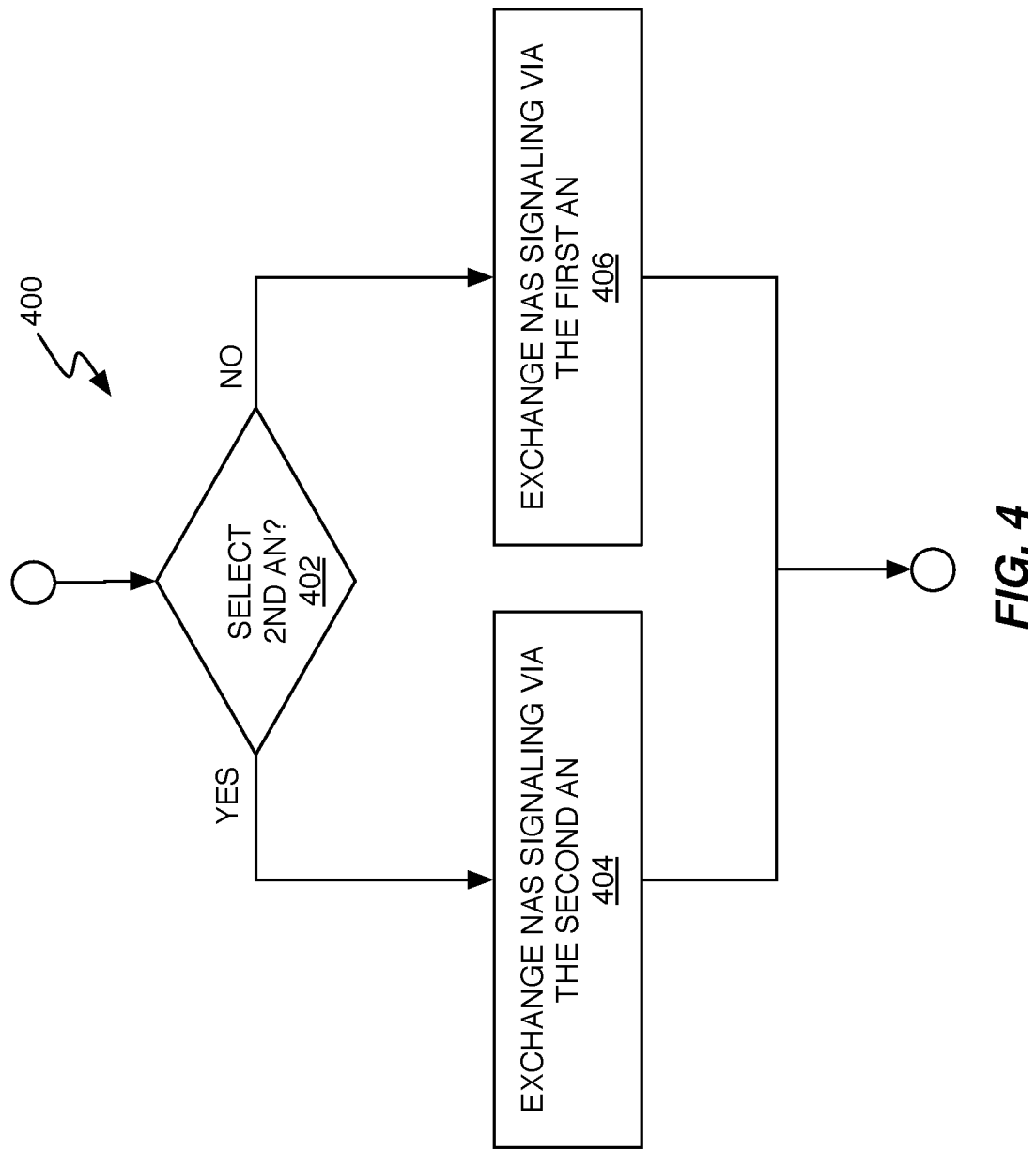
FIG. 4 is a logic flow diagram of one embodiment of a method of NAS signaling at a network node.

Broadly, however, the teachings herein provide for the offloading of at least some NAS signaling from the first AN 16 to the second AN 18, based on conditionally selecting the second AN 18 for such purposes. FIG. 4 illustrates a method 400 according to one embodiment of such processing. It will be appreciated that one or more steps in the method 400 may be performed in parallel or in an order other than that suggested by the flow diagram, and that such processing may be performed on a per-device basis with respect to any number of wireless devices 20 and may be repeated any number of times with respect to an individual wireless device 20.

In the context of a wireless communication network 12 that includes a CN 14 and an associated first AN 16, the method 400 includes conditionally selecting (YES from Block 402) a second AN 18 for exchanging NAS signaling between the communication network 12 and a targeted wireless device 20. The second AN 18 is different from the first AN 16 and the NAS signaling relates to mobility management or session management of the targeted wireless device 20 with respect to the first AN 16. The method 400 further includes exchanging (Block 404) the NAS signaling with the targeted wireless device 20 via the second AN 18, when the second AN 18 is selected (the YES path from Block 402). The method 400 further includes exchanging (Block 406) the NAS signaling with the targeted wireless device 20 via the first AN 16, when the second AN 18 is not selected (the NO path from Block 402).

The method 400, or variations thereof, may be applied in the context of FIG. 5, wherein the first AN 16 is represented via a macro cell 16-1 served by a macro base station 50-1, a pico cell 16-2 served by a pico base station 50-2, and a pico cell 16-3 served by a pico base station 50-3. The base stations 50 operate as access points providing connectivity via the first AN 16, and the diagram depicts the base stations 50 as having direct connectivity back to the CN 14, which here includes an MME 54, an S-GW 56, and a P-GW 58. The second AN 18 is represented as another pico cell overlaying the macro-cell 16-1 of the first AN 16, which pico cell is served by a pico base station or access point 52. As a non-limiting example, the access point 52 is a Wi-Fi router having indirect connectivity to the CN 14 via an IP network 22, which may be a public or private IP network. The second AN 18 in this example may be, e.g., a public Wi-Fi network.

In a notable aspect of FIG. 5, one sees that the network node 10 may be implemented either in the first AN 16, e.g., at the macro base station 50-1, or in the CN 14, such as in the MME 54. To the extent that the CN 14 includes multiple MMEs 54, the network node 10 may be replicated on a per-MME basis, or one network node 10 may serve multiple MMEs. Similarly, individual base stations 50 in the first AN 16 may each implement the functionality of the network node 10, or a network node 10 may serve groups of such base stations 50.

Figure 6:
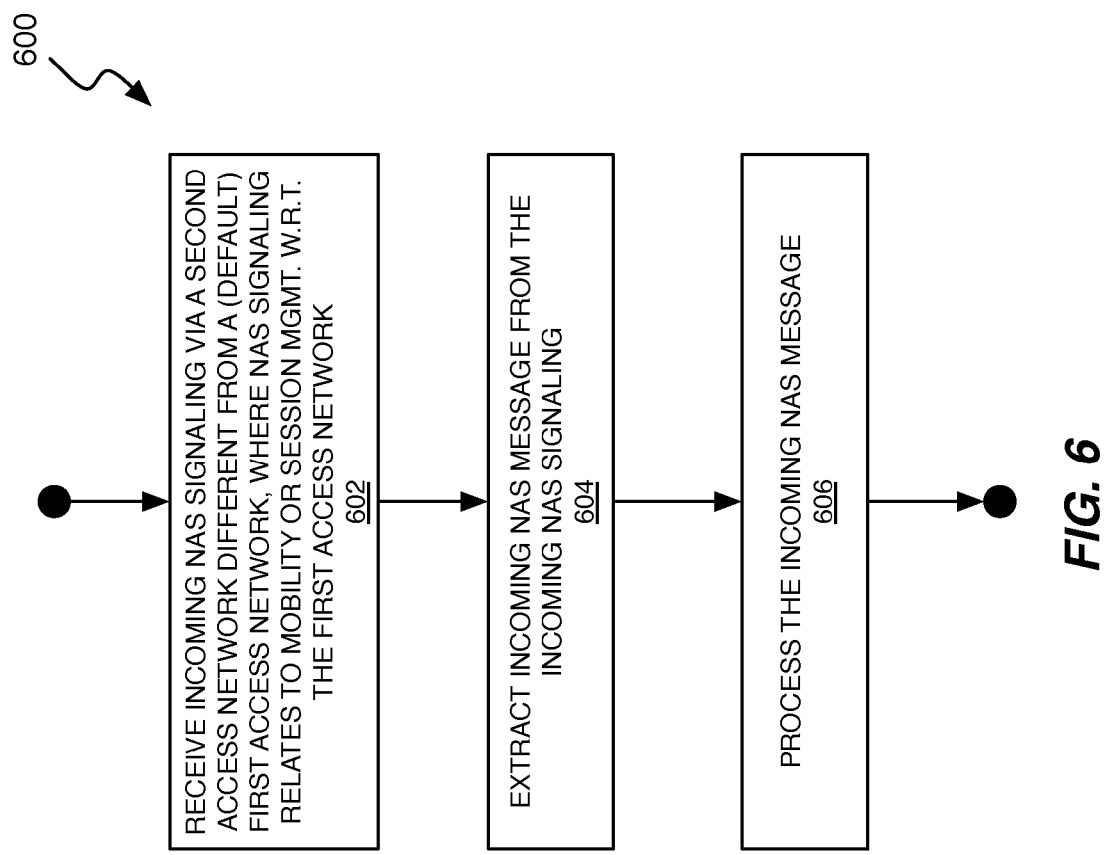
FIG. 6 is a logic flow diagram of one embodiment of a method of NAS signaling at a wireless device.

Turning to device-side aspects of the teachings herein, FIG. 6 depicts a method 600 of processing NAS signaling in a wireless device 20 operating in a communication network 12 that comprises a first AN 16 and a CN 14. The method 600 includes receiving (Block 602) incoming NAS signaling via a second AN 18 that is different than the first AN 16 but is communicatively linked directly or indirectly to the communication network 12. The first AN 16 may be considered to be the default AN in the sense that it is part of the communication network 12 and in the sense that all NAS signaling exchanged between the CN 14 and a targeted wireless device 20 would conventionally be conveyed using the air interface provided by the first AN 16. In that regard, the incoming NAS signaling relates to mobility management or session management of the targeted wireless device 20 with respect to the communication network 12, including the first AN 16, and the method 600 further includes extracting (Block 604) an incoming NAS message from the incoming NAS signaling and passing the incoming NAS message to a NAS processing layer of the wireless device 20; and processing (Block 606) the incoming NAS message via the NAS processing layer.

It will be appreciated that the method 600 may be implemented in the wireless device 20 using fixed circuitry, programmed circuitry, or some combination of both. It will be further appreciated that one or more steps in the method 600 may be performed in an order different than that indicated and/or may be performed in parallel or along with other processing operations, e.g., as part of ongoing operations at the wireless device 20. Further, the method 600 may be performed repeatedly, at least for the exchange of some types of NAS signaling.

In some embodiments, the second AN 18 is communicatively linked to the communication network 12 via an IP network 22, which may the Internet, and receiving (Block 602) the incoming NAS signaling via the second AN 18 comprises receiving one or more IP packets via the second AN 18. Correspondingly, the step of extracting (Block 604) the incoming NAS message from the incoming NAS signaling comprises the wireless device 20 extracting the incoming NAS message from the one or more incoming IP packets. Further, in at least one such embodiment, the incoming NAS message as conveyed in the one or more IP packets is encrypted, and the step of extracting (Block 604) the incoming NAS message from the one or more IP packets comprises decrypting the incoming NAS message before passing it to the NAS processing layer of the wireless device 20.

In some embodiments, a NAS client 28 in the wireless device 20 performs the steps of receiving (Block 602) the incoming NAS signaling, and extracting (Block 604) the incoming NAS message from the incoming NAS signaling. Further, the NAS client 28, which may be implemented via the programmatic configuration of a digital processing circuit, handles the passing of the incoming NAS message to the NAS processing layer of the wireless device 20. The NAS processing layer, which may be implemented in the same or another digital processing circuit, can be understood as the conventional NAS processing circuit of the wireless device 20, such that it processes NAS signaling, whether that signaling conventionally flows through the first AN 16, or conditionally flows through the second AN 18 as taught herein. Thus, the NAS client 28 can be understood as a pre-processor for un-packaging incoming NAS signaling received at the wireless device 20 via the second AN 18, and as post-processor for packaging outgoing NAS signaling for transport via the second AN 18.

Figure 7:
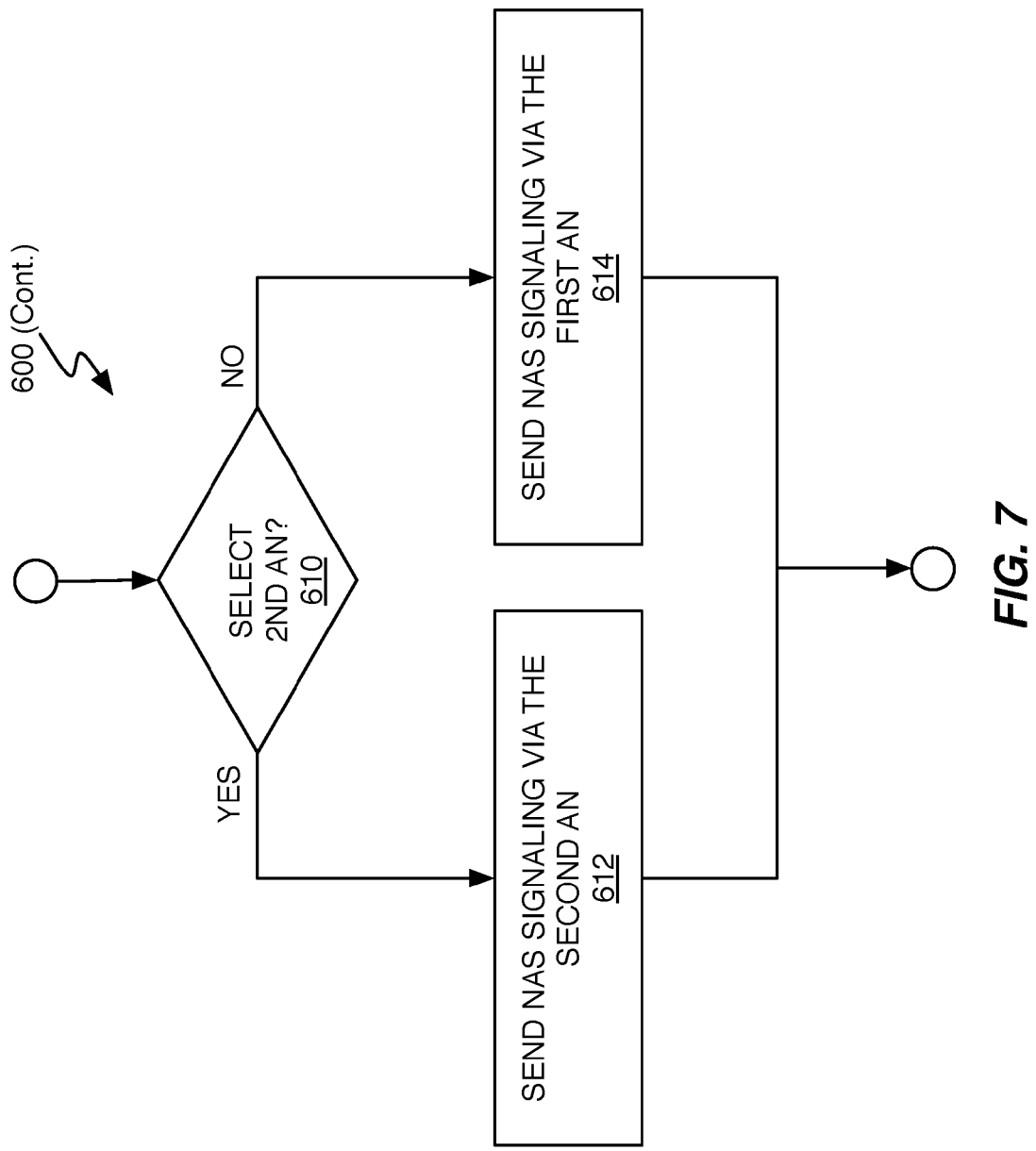
FIG. 7 is a continuation of the logic flow diagram introduced in FIG. 6.

As for that latter case, as illustrated in FIG. 7, the method 600 may further include conditionally sending an outgoing NAS message to the communication network 12 via the second AN 18 rather than via the first AN 16 (YES from Block 610 into Block 612). Conditionally sending (Blocks 610, 612) the outgoing NAS message to the communication network 12 via the second AN 18 rather than via the first AN 16 comprises, for example, selecting the second AN 18 for sending the outgoing NAS message responsive to one or more of the following conditions being met: receiving a corresponding incoming NAS message via the second AN 18; detecting the availability of the second AN 18 for sending the outgoing NAS message to the communication network 12; and receiving an indication from the communication network 12, indicating that the second AN 18 should be used by the wireless device 20 for sending the outgoing NAS message. If none of these conditions are met, the method 600 includes otherwise sending the outgoing NAS message to the communication network 12 via the first AN 16 (NO from Block 610 into Block 614).

For sending (Blocks 610, 612) an outgoing NAS message to the communication network 12 via the second AN 18, the method 600 in some embodiments includes encrypting the outgoing NAS message and sending the encrypted outgoing NAS message. In the same or another embodiment, sending (Blocks 610, 612) the outgoing NAS message to the communication network 12 via the second AN 18 includes encapsulating the outgoing NAS message into one or more outgoing IP packets, and sending the one or more outgoing IP packets. In general, it will be appreciated that the outgoing NAS signaling is packaged or otherwise processed into whatever transmission units are defined by the second AN 18 and any intervening network link(s) communicatively coupling the second AN 18 to the communication network 12.

Figure 8:
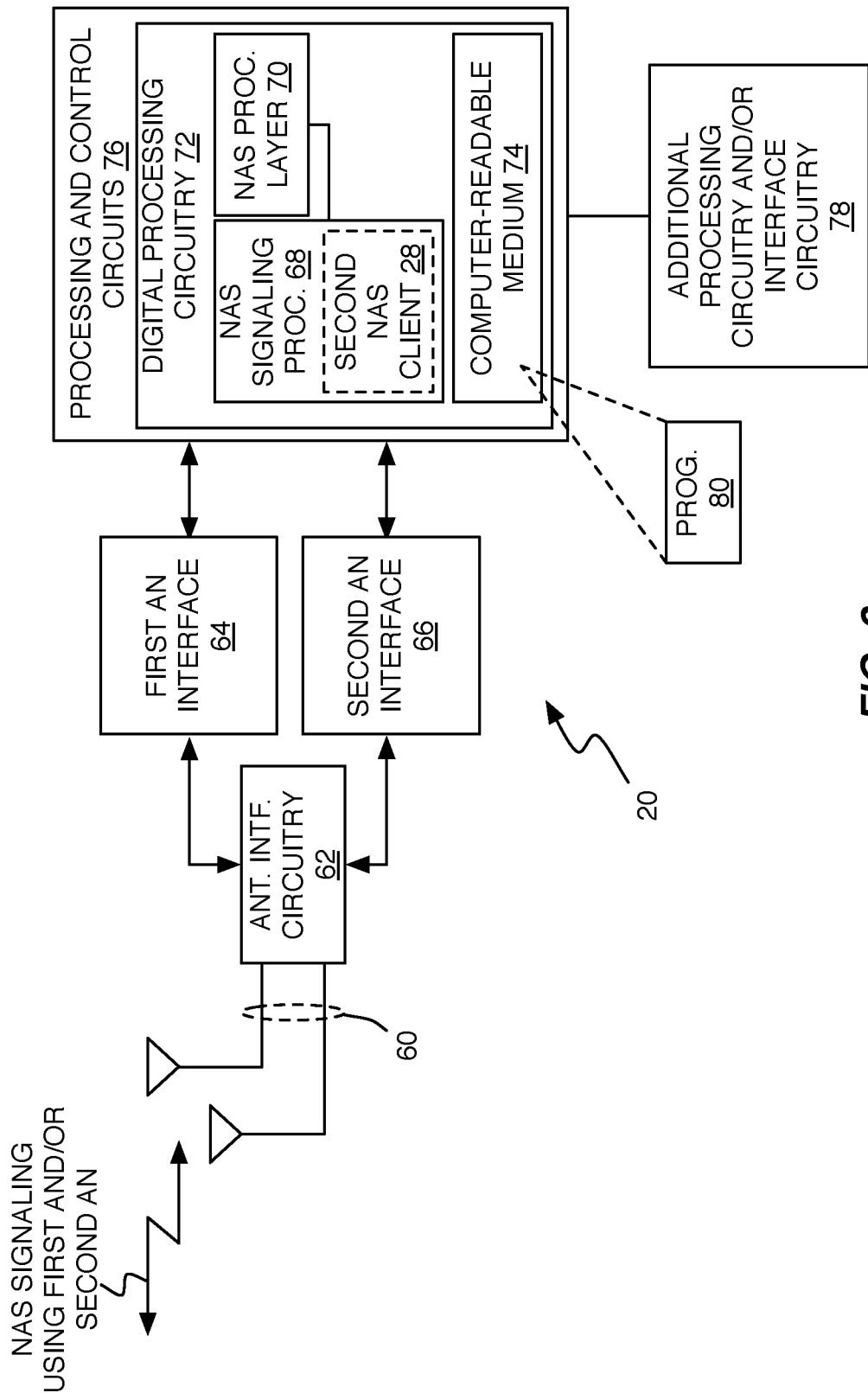
FIG. 8 is a block diagram of one embodiment of a wireless device configured for NAS signaling according to the teachings herein.

FIG. 8 illustrates an example embodiment of the contemplated wireless device 20, which is configured for operation in a communication network 12 comprising a first AN 16 and a CN 14. The wireless device 20 includes one or more antennas 60, antenna interface circuitry 62, a first communication interface 64 towards the first AN 16, a second communication interface 66 towards the second AN 18, a NAS signaling processor 68, which implements the aforementioned NAS client 28 and includes or communicatively couples with the aforementioned NAS processing layer, which may be understood as a functional processing circuit and which is depicted here as "NAS processing layer 70".

The NAS signaling processor 68 and the NAS processing layer 70 may comprise all or a portion of digital processing circuitry 72 implemented within the wireless device 20. Such circuitry further includes or is associated with program and data memory, including some type of computer-readable medium 74 that is configured to provide non-volatile—non-transitory—storage. The digital processing circuitry 72 comprises all or part of the overall processing and control circuits 76 implemented by the wireless device 20, which circuitry will be understood in one or more embodiments as comprising one or more digital processing circuits, such as microprocessor-based circuitry, DSP-based circuitry, and/or FPGA- or ASIC-based circuitry. Further, depending on its features and intended functionality, the wireless device 20 includes additional processing and/or interface circuitry 78.

The first communication interface 64 is configured for operation with the first AN 16, e.g., it comprises a radiofrequency transceiver configured for operation according to the air interface provided by the first AN 16. In some embodiments at least, the first communication interface 64 comprises a 3GPP radio transceiver such as would be implemented in a UE or other apparatus configured for operation in the communication network 12. The second communication interface 66 is configured for operation with the second AN 18, which is different than the first AN 16. For example, the second AN 18 is a non-3GPP AN, such as a Wi-Fi network.

The digital processing circuitry 72, including the NAS signaling processor 68, which is also referred to as "one or more processing circuits 72", is operatively associated with the first and second communication interfaces 64 and 66, and is configured to: receive incoming NAS signaling via the second AN 18, wherein the incoming NAS signaling relates to mobility management or session management of the targeted wireless device 20 with respect to the first AN 16; extract an incoming NAS message from the incoming NAS signaling and pass the incoming NAS message to the NAS processing layer 70 of the wireless device 20, as implemented in the one or more processing circuits 72; and to process the incoming NAS message via the NAS processing layer 70.

Notably, the NAS processing layer 70 may be used in general to process outgoing NAS signaling, irrespective of whether that NAS signaling is to be conveyed via the first AN 16 or the second AN 18. Thus, the NAS processing layer 70 may be regarded as providing conventional NAS processing for outgoing NAS signaling that is then passed to the NAS signaling processor 68 for conditionally deciding whether to send the NAS signaling via the first AN 16 or the second AN 18, and for applying whatever additional processing is needed in the case that the second AN 18 is to be used—e.g., encryption, encapsulation, etc. Similarly, the NAS processing layer 70 may be used generically to processing incoming NAS signaling, irrespective of whether the incoming NAS signaling was received through the first AN 16 or the second AN 18. Of course, in the latter case, the NAS signaling processor 68 will un-encapsulate, decrypt, or otherwise process the incoming NAS signaling, as needed, before it is transferred to the NAS processing layer 70.

For example, the second AN 18 is communicatively linked directly or indirectly to the communication network 12 via an IP network 22. Here, the incoming NAS signaling as received via the second AN 18 comprises one or more IP packets received via the second AN 18, and the one or more processing circuits 72 are configured to extract the incoming NAS message from the one or more IP packets. In at least one such embodiment, the incoming NAS message as conveyed in the one or more IP packets is encrypted, and the one or more processing circuits 72 are configured to extract and decrypt the incoming NAS message before passing the incoming NAS message to the NAS processing layer 70 of the wireless device 20.

In the same or similar embodiments, outgoing NAS signaling to be conveyed via the second AN 18 is passed to the NAS signaling processor 68 for encapsulation—with or without encryption—into one or more outgoing IP packets. The NAS signaling processor 68 uses, for example, a routing address or other node identifier, for including sufficient information in the outgoing IP packets such that they are properly routed through the second AN 18 and IP network 22, towards the targeted network node 10, or towards the NAS server 24 for forwarding to the targeted network node 10.

Figure 9:
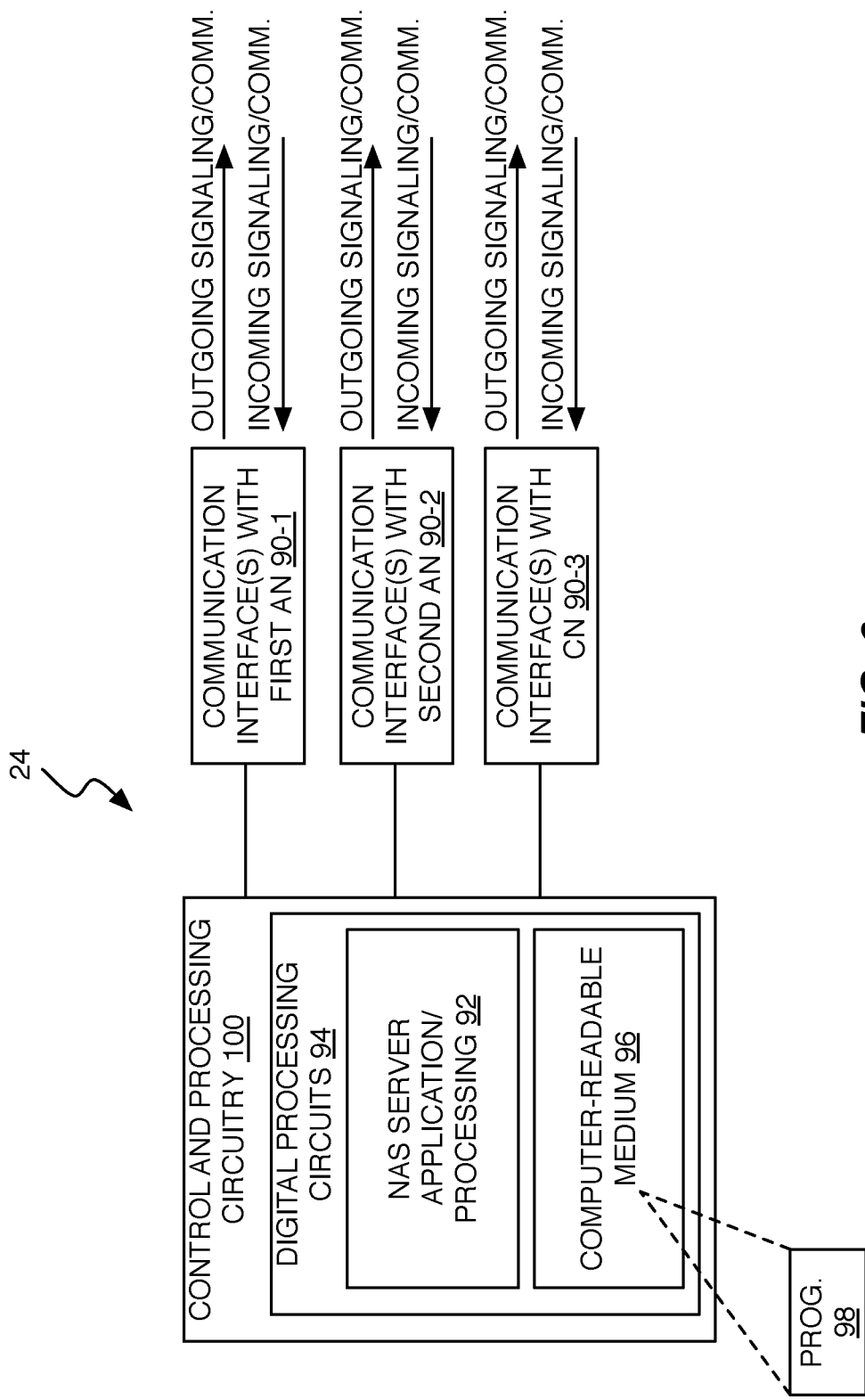
FIG. 9 is a block diagram of one embodiment of an Internet Protocol, IP, server configured for NAS signaling according to the teachings herein.

To better understand such processing, consider the example embodiment of the NAS server 24 as shown in FIG. 9. The example NAS server 24 includes one or more communication interfaces 90, in dependence on whether the network node 10 as described herein is implemented in the first AN 16, or in the CN 14. For example, the NAS server 24 includes one of more of: a first communication interface 90-1 towards the first AN 16, a second communication interface 90-2 towards the second AN 18, and a third communication interface 90-3 towards one or more other nodes in the CN 14.

The NAS server 24 further includes NAS Server application/processing circuitry 92, which comprises all or part of digital processing circuitry 94 that includes or is associated with a computer-readable medium 96. In one or more embodiments, the digital processing circuitry 94 is configured to perform the NAS-server functionality described herein, based on executing a computer program 98 comprising computer program instructions that are stored on a non-transitory basis in the computer-readable medium 96. Broadly, the digital processing circuits 94 and the computer-readable medium 96 may be regarded as comprising all or a portion of the control and processing circuitry 100 included in the NAS server 24. In this regards, in one or more embodiments, the NAS server 24 will be understood as comprising a computer system having a central processing unit or units, and associated memory and input/output circuitry.

The NAS server 24 is configured for operation in the CN 14, regardless of its particular implementation details, and the digital processing circuits 94 are operatively associated with at least the communication interface 90-2. These circuits, which for convenience may be referred to simply as "one or more processing circuits 94", are configured to forward incoming NAS signaling, as sent from the targeted wireless device 20 via the second AN 18, to a targeted network node 10 within the first AN 16 or within the core network 14. This forwarding of incoming NAS signaling is based on the NAS server 24 reading a node identifier included in the incoming NAS signaling. The one or more processing circuits 94 are further configured to forward outgoing NAS signaling, as sent from the targeted network node 10 for conveyance to the targeted wireless device 20 via the second AN 18, towards the targeted wireless device 20 via the second AN 18. This forwarding of outgoing NAS signaling is based on the NAS server 24 maintaining a mapping between an identity of the targeted wireless device 20 in the communication network 12 and a routing address of the targeted wireless device 20 in the second AN 18.

Non-limiting examples of NAS procedures that may be signaled through the second AN 18 rather than through the first AN 16 include EMM specific procedures and common procedures, such as any one or more of the following: attach, detach, TAU, GUTI reallocation, authentication, security mode control, identification, and EMM information exchange. It is also recognized herein that other 3GPP RAN procedures, such as Location Area Updates, LAUs and Routing Area Updates, RAUs, etc., can be performed using a non-3GPP RAN, rather than conventionally with the involved 3GPP RAN. Further, while certain NAS procedures generally are not suitable for conveying over the second AN 18, such as ESM procedures, which are followed by data transmissions via the first AN 16, in the future, more NAS messages may be suitable for communication over non-3GPP RANs. One example is a policy for non-3GPP access network selection, where the communication network 12 is a 3GPP network, the first AN 16 is a 3GPP RAN, and the second AN 18 is a non-3GPP RAN.

Broadly, when a UE or other type of wireless device 20 is connected to a non-3GPP network, e.g. Wi-Fi, and a NAS procedure is initiated, it is beneficial to both the 3GPP network and the wireless device 20 to take advantage of the active Wi-Fi link, to exchange NAS messages between the wireless device and the 3GPP core network.

The wireless device 20 can decide which RAT—i.e., either the first AN 16 as the 3GPP RAN or the second AN 18 as the non-3GPP RAN—to use for NAS messaging, based on its current mode/state with respect to the 3GPP and non-3GPP RANs. For example, if the wireless device 20 knows that it is in the RRC IDLE mode in the 3GPP RAN and knows that it has a Wi-Fi connection via the second AN 18, it can choose to send NAS messages via the Wi-Fi link without temporarily switching to the RRC_CONNECTED mode, which conventionally would be required for sending a NAS message. Similarly, if the communication network 12 is aware that a Wi-Fi connection is available for NAS transmissions targeted to a particular wireless device 20, it can decide to use that connection for the NAS connection, rather than using the first AN 16.

Based on different integration levels of Wi-Fi and LTE networks, NAS messages can be delivered through the Wi-Fi link in different ways. The following sections describe example procedures contemplated herein for the different integration scenarios.

In a first scenario, the first AN 16 is an LTE E-UTRAN or other 3GPP RAN, the second AN 18 is a Wi-Fi network, and there is no integration between the communication network 12 and the second AN 18. As such, any user traffic conveyed via the Wi-Fi network will not reach the CN 14 before going over the Internet. Home Wi-Fi, enterprise Wi-Fi and public Wi-Fi networks all belong to this category of non-integrated second ANs 18.

Without integration, NAS messages may be transmitted using Over-the-Top, OTT, communications conveyed over the IP network 22. The wireless device 20 in this case may not be able to connect to an eNB or an MME directly via an OTT link because the IP address of the eNB and MME may not be available in the wireless device 20. However, the NAS clients 26, 28 may be responsible to encapsulate/extract the NAS messages into/from IP packets and exchange the packets with the NAS server 24, which is responsible for forwarding the exchanged NAS messages to the target network node 10 or the wireless device 20.

Figure 10:
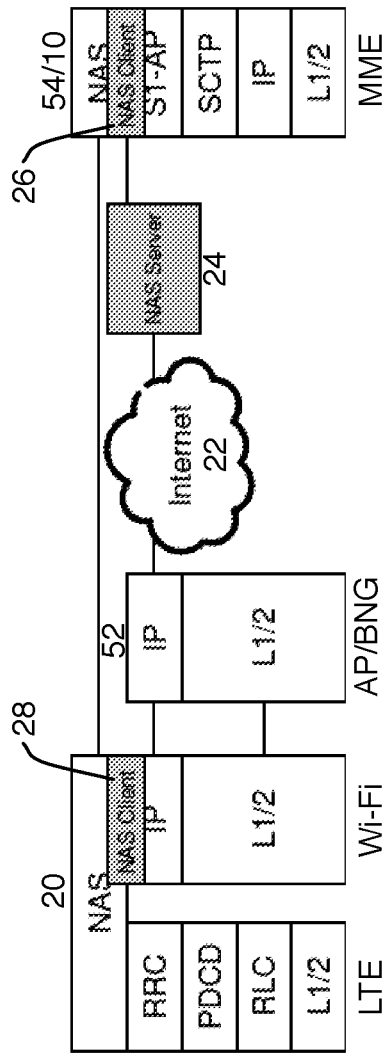
FIGS. 10-13 are diagrams of example protocol stacks according to various implementations of NAS signaling as taught herein.
Figure 11:
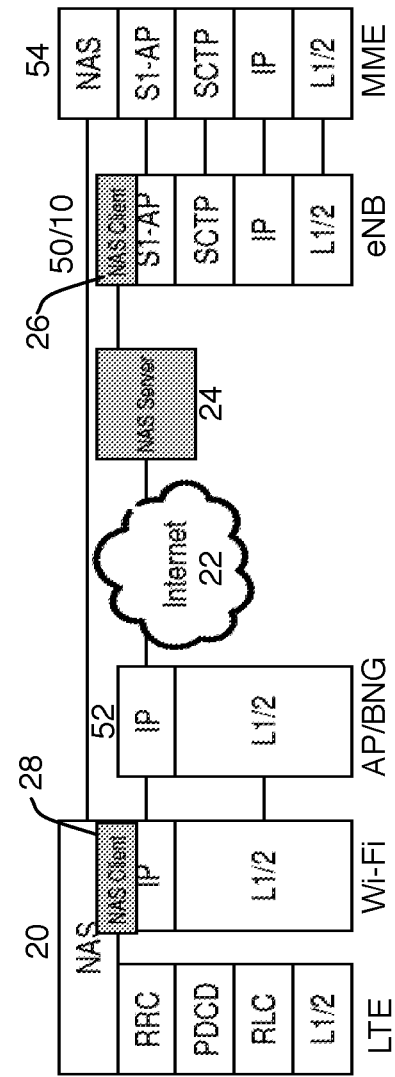

The network-side NAS client 26 may be installed in either an eNB or an MME or, more generally, the previously described network node 10 with its included NAS client 26 may be implemented in or co-located with an eNB in the LTE E-UTRAN or with an MME in the LTE EPC. FIG. 10 depicts example protocol stacks assuming that the network node 10 is implemented at an MME 54, as shown in FIG. 5. Here, the Wi-Fi AP or Broadband Network Gateway, BNG, is depicted as the AP 52 from FIG. 5. FIG. 11 is similar except that it assumes that the AP 50 from FIG. 5 is an LTE eNB, and that the network node 10 is implemented therein. Thus, FIG. 10 can be understood as depicting example protocol stacks for the case where the network node 10 is implemented at the MME level in the LTE EPC, and while FIG. 11 depicts example protocol stacks for implementation of the network node 10 at the eNB level in the LTE E-UTRAN. Both diagrams, however, assume no integration between the Wi-Fi and LTE networks.

Without any integration, the connection between the NAS server 24 and the NAS client 28 in the wireless device 20 may need extra security consideration, because the NAS messages go through an unsecured link over the Internet. Consequently, in some embodiments contemplated herein, the NAS messages exchanged over the Internet are encrypted.

As for the NAS client 28 in the wireless device 20, the NAS signaling processor 68 passes the NAS messages from the NAS processing layer to the NAS client 28, if it is decided to use a Wi-Fi link for the transmission. Thus, as an example listing of functions regarding outgoing NAS signaling, the NAS client 28 is configured to: (a) receive NAS messages from the NAS processing layer 70, e.g., via decision-making circuitry implemented in the NAS signaling processor 68; (b) encapsulate the NAS messages into IP packets; (c) include an MME or eNB identity in the IP packets; (d) send the IP packets to the NAS server 24 via the Wi-Fi link/IP network 22; and (e) in at least some embodiments, encrypt the NAS messages for encapsulation into the IP packets.

Among the possible mechanisms for identifying the routing target—i.e., the intended network node 10—to the NAS server 24, the NAS client 28 at the wireless device 20 may use a Global Unique MME Identity, GUMMEI, corresponding to the targeted MME 54 in the CN 14. This identity is part of the Global Unique Temporary UE Identity, GUTI, which may be known to the wireless device 20. Of course, the GUMMEI may be unavailable in the wireless device 20 under some circumstances, such as when the wireless device 20 moves to a new tracking area and has not yet received a GUTI from the associated MME 54. In this case, the wireless device 20 may use an eNB identity instead and the involved eNB then forwards the NAS message to the MME 54 using standard NAS procedures. One example of a usable eNB identity is the E-UTRAN Cell Global Identity or ECGI. The ECGI is broadcasted in a System Information Block SIB and the wireless device 20 reads it by listening to the broadcast channel Both the ECGI and the GUMMEI are global unique identifiers and can therefore be used to uniquely identify an MME or eNB.

As for example receiving operations, the NAS client 28 processes NAS packets received from the second AN 18, e.g., the Wi-Fi network as a continuation of the above example discussion. After any treatment or processing needed to un-encapsulate, decrypt, or otherwise recover the NAS messages from the incoming IP packets, the recovered NAS messages are passed by the NAS signaling processor 68 to the NAS processing layer 70, for conventional NAS processing. Example functions of the NAS client 28 in the wireless device 20 when receiving NAS messages via the second AN 18 include any one or more of the following items: (a) extract the NAS messages from incoming NAS IP packets; (b) forward the NAS messages to the NAS processing layer 70, e.g., via forwarding logic included in the NAS signaling processor 68; and (c) decrypt the incoming NAS messages, if such messages are encrypted. Once the NAS processing layer 70 in the wireless device 20 gets the NAS messages from the NAS client 28, it may process them the same way as NAS messages that are conventionally conveyed via the RRC layer in LTE.

Referring again to FIG. 10, the NAS client 26 on the network side may be deployed in an MME 54 according to the illustrated arrangement. Here, it is understood that the functionality contemplated for the network node 10 is embedded in the MME 54 by way of the NAS client 26 and that the aforementioned communication interface(s) included in the network node 10 are implemented in the MME 54. When implemented in an MME 54, the NAS client 26 performs any one or more of the following example functions: (a) decrypt NAS messages incoming from the second AN 18, e.g., incoming from the IP network 22; (b) receive such incoming NAS messages via the NAS server 24; (c) extract incoming NAS messages from the IP packets used to convey them over the IP network 22; and (d) pass the extracted NAS messages to a conventional NAS processing layer in the MME 54.

As for NAS messages outgoing from the MME 54 via the second AN 18, the NAS client 26 performs any one or more of the following example functions: (a) receive the NAS messages from the conventional NAS processing layer of the MME, e.g., via decision-making operations of the NAS signaling processor 32, as shown in FIG. 3 and as at least functionally implemented in the MME 54; (b) encapsulate the outgoing NAS messages into suitable units, e.g. IP packets, for transport over the network links associated with the second AN 18; (c) include an identity or other indication of the targeted wireless device 20; (d) encrypt the outgoing NAS messages, if encryption is being used; and (e) send the outgoing units, e.g., IP packets, to the NAS server 24, for transport to the targeted wireless device 20 via the second AN 18. The GUTI and a Temporary Mobile Subscriber Identity, TMSI, are examples of the wireless device identity that may be known to the MME 54 and included in the outgoing units, for identifying the targeted wireless device 20 to the NAS server 24.

FIG. 11, as noted, depicts an example protocol stack arrangement where the functionality of the network node 10 is implemented in an eNB, e.g., where the base station or access point 50 in FIG. 5 is an eNB. When the network client 26 is implemented in an eNB, it implements any one or more of the example functions: (a) receive and process NAS messages incoming to the eNB as forwarded from the NAS server 24—i.e., NAS messages conveyed via the second AN 18 and any supporting networks, such as the IP network 22; (b) convert the incoming NAS messages into standard NAS signaling formats—e.g., to recover NAS messages in their conventional form, such as by un-encapsulating the NAS messages from IP packets or other transport containers and, if necessary, decrypting them; and (c) forward the recovered NAS messages in their conventional form to the associated MME 54 via the S1-MME interface. That is, once a NAS message as forwarded to the eNB from the NAS server 24 is processed as needed to recover it in its conventional or standard format, the recovered NAS message may be treated the same way as conventional NAS signaling incoming to the eNB via the LTE RRC layer.

When sending outgoing NAS messages from the eNB, for transport to the targeted wireless device 20 via the second AN 18, the NAS client 26 performs any one or more of the following example functions: (a) receive conventional NAS messages from an associated MME 54; (b) process the NAS messages for forwarding to the NAS server 24, for transport to the targeted wireless device 20 via the second AN 18, including, e.g., encrypting and/or encapsulating the conventional NAS messages into one or more IP packets; (c) including an identifier or other indication of the targeted wireless device 20 in the outgoing IP packets or other such transport unit as is appropriate for the particulars of the second AN 18 and the intervening network links; and (d) send the outgoing IP packets or other transport units to the NAS server 24, for routing to the targeted wireless device 20 via the second AN 18.

A Cell Radio Network Temporary Identifier or C-RNTI represents one identity that may be known to the eNB for the targeted wireless device 20. Thus, in at least one embodiment, the NAS client 26 as implemented in an eNB processes a conventional NAS message from an MME 54 by encapsulating it into one or more IP packets, along with the C-RNTI of the wireless device 20 targeted by the NAS message. The NAS client 26 then sends the one or more IP packets to the NAS server 24, which has IP addressing information for the targeted wireless device 20, and which maintains a mapping between that IP addressing and the C-RNTI or other such device identifier, such that the NAS server 24 includes the proper routing addresses in the outgoing IP packets, for routing to the targeted wireless device 20 via the second AN 18.

The NAS server 24 in this regard assists the exchange of NAS messages between the CN 14 and a targeted wireless device 20, in the case that an alternate, second AN 18 is used for conveyance of those messages. A given wireless device 20 and its supporting MME/eNB may not know the IP address of each other, with respect to the Wi-Fi or other network connection associated with the second AN 18, but the NAS server 24 knows, detects or otherwise learns the respective IP addresses, and thereby acts as router for sending NAS messages outgoing from CN 14 for transport over the IP network 22 and delivery to the targeted wireless device 20 via the second AN 18, and for receiving NAS messages incoming to the CN 14 from the IP network 22. It will be appreciated that all or part of such NAS server functionality may be realized in fixed circuitry and/or in programmed circuitry that takes on the specified functional configuration based at least in part on the execution of a computer program 98 stored in program memory or another computer-readable medium 96 in the NAS server 24—such as shown in FIG. 9.

Also with respect to FIG. 9, the presence and configuration of the depicted communication interfaces 90-1, 90-2 and 90-3 will depend on the location and integration, or lack thereof, of the NAS server 24 with respect to the CN 14, the first AN 16, and/or the second AN 18. For example, the depicted interface 90-3 with the CN 14 may be, e.g., a communication link to an MME 54 in the CN 14, so that the NAS server 24 can receive NAS signaling from the MME 54 and send it to the targeted wireless device 20 via the second AN 18. Conversely, the interface 90-2 with the second AN 18 is used to receive NAS signaling from the wireless device 20, as sent through the second AN 18, and to then forward such signaling to the MME 54 or other targeted CN node.

It will be appreciated that the communication interface 90-2 with the second AN 18 is, in at least one embodiment, an IP-based interface. Further, it will be appreciated that the communication interface 90-1 with the first AN 16 may be omitted, at least for configurations in which the NAS server 24 is bypassed for those instances when conventional transport of the NAS signaling through the first AN 16 is used for exchanging NAS signaling between the CN 14 and the wireless device 20. Further, it will be appreciated that one of the communication interfaces 90-1 and 90-3 with the first AN 16 and CN 14, respectively, may be omitted depending on the location of the network-side NAS client 26. The NAS server 24 may be either a standalone node or a functional entity installed in an existing node, e.g. a P-GW or a BNG.

For packets incoming from the wireless device 20 via the second AN 18, the NAS server 24 may read the GUMMEI or the ECGI in the packets and forward the included NAS messages to the target MME or eNB. One way to fulfill the forwarding is to maintain a mapping between GUMMEI/ECGI and MME/eNB IP addresses in the NAS server 24 and to transmit the messages over the IP layer. Another example is to use the GTP-C protocol for the forwarding toward the targeted MME if the NAS server 24 is functionally implemented in the P-GW.

To send the NAS messages to the wireless device 20 via the second AN 18, the NAS server 24 may maintain a mapping between a wireless device identity known by the MME or the eNB, e.g. a GUTI or C-RNTI, and the IP address of the wireless device 20 in the context of the second AN 18. Note that in dependence on whether and to what extent there is integration between the second AN 18 and the communication network 12, the wireless device 20 may have one IP address for its connection to the communication network 12 and another IP address for its connection to the second AN 18, e.g., another IP address for use with the Wi-Fi connection provided by the second AN 18. The mapping may be obtained from the wireless device 20, based on the device 20 including its GUTI or C-RNTI in the IP packets encapsulating NAS messages outgoing from the device 20, for transport via the second AN 18 and the IP network 22.

As an alternative to no integration between the communication network 12 and the second AN 18, the second AN 18 may enjoy integration with at least the CN 14. With Wi-Fi user-plane integration with the CN 14, the wireless device 20 has direct access to the CN 14 via the Wi-Fi radio connection—i.e., the communications carried over the Wi-Fi link do not have to flow across the Internet. The wireless device data traffic will be routed through the AP/BNG associated with the second AN 18 to the P-GW in the CN 14, and the P-GW then further routes the traffic to the Internet. 3GPP standardization efforts have considered various levels of integration between Wi-Fi networks and 3GPP CNs. However, all integration levels under consideration focus on providing IP connectivity between a wireless device and the P-GW of the 3GPP CN. Therefore, methods similar to the "no-integration" scenario above can be implemented for all Wi-Fi/CN integration levels.

Figure 12:
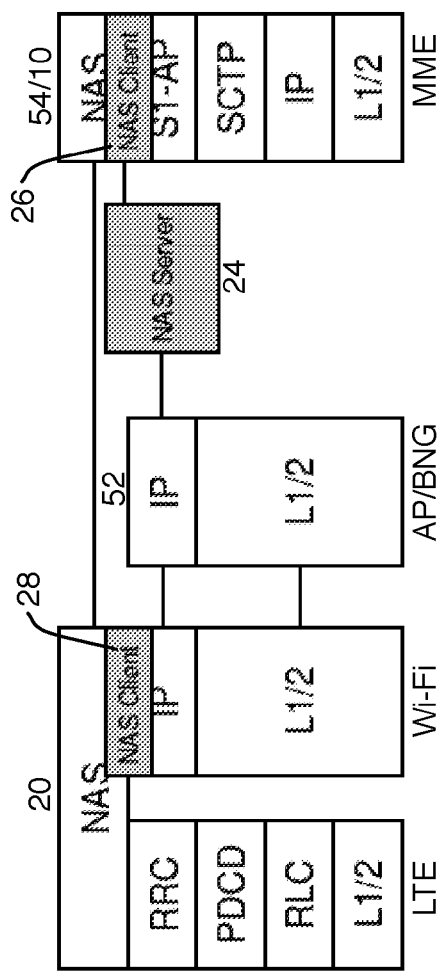
Figure 13:
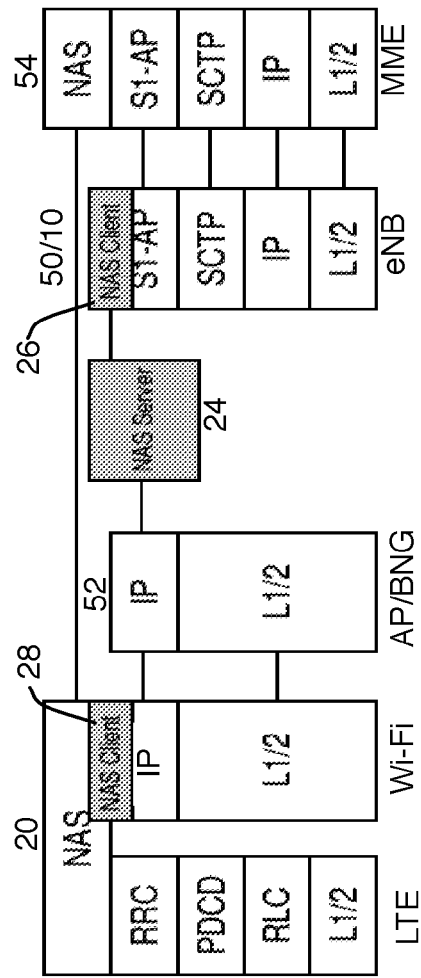

FIGS. 12 and 13 depict examples of the protocol stacks for two alternative solutions involving different implementations of integration between the second AN 18 and the CN 14. FIG. 12 assumes that the functionality of the network node 10, with its NAS client 26, is implemented at the MME level in the CN 14. In contrast, FIG. 13 assumes that the functionality of the network node 10/NAS client 26 is implemented at the eNB level in the first AN 16. For both cases, when the second AN 18 is integrated with the CN 14, the wireless device 20 and the communication network 12 may have performed mutual authentication and the connection is established over a dedicated tunnel. In this case, the security considerations for NAS signaling sent over the second AN 18 are reduced, as compared to the case where there is no integration of the second AN 18 with the CN 14.

In another aspect of the teachings herein, it is recognized that the second AN 18, e.g., as a Wi-Fi network, may not be as reliable as the first AN 16, e.g., as a 3GPP RAN. Consequently, there is a risk that NAS signaling exchanged via the second AN 18 will be lost or corrupted. Therefore, in one or more embodiments disclosed herein, the entities involved in the exchange of NAS signaling via the second AN 18 are configured with a fallback capability, in which the involved entities revert to "normal" NAS procedures over the first AN 16, in the case of a signaling failure over the second AN 18.

In an example implementation, a timer, e.g., a timer "T1", is defined to trigger the fallback to conventional NAS signaling exchange via the first AN 16. When a first NAS message is sent over the second AN 18, the timer T1 starts. If the NAS procedure is not completed successfully before the timer expires, the same NAS procedure will be performed using the first AN 16.

Additionally, or alternatively, a maximum number of retransmissions is defined and denoted as Nm. For NAS signaling to be exchanged via the second AN 18, if the number of NAS retransmissions over the second AN 18 reaches Nm, the fallback will be triggered as well. More generally, the sending entity—e.g., the wireless device 20, or network node 10/NAS server 24—is, in one or more embodiments, configured to use the first AN 16 to exchange a NAS signaling message with a wireless device 20 in cases where exchange of that message via the second AN 18 is unsuccessful. Further, in at least one embodiment, the NAS procedure and/or any related follow-on NAS signaling will be exchanged using the first AN 16.

Broadly, then, it is contemplated herein to configure a network node 10 for operation in or in association with a CN 14 that is associated with a first AN 16 that provides connectivity between a wireless device 20 and the CN 14. In this regard, the first AN 16 will be understood as being "dedicated" for connectivity to the CN 14. The network node 10 is configured to use a second AN 18 to exchange with the wireless device 20 at least a portion of the NAS signaling relating to mobility and/or session management of the wireless device 20, with respect to its operation in the first AN 16. That is, the network node 10, which may be a base station or other node in the first AN 16, or which may be an MME 54 or other such node in the CN 14, is configured to exchange one or more NAS messages with the wireless device 20 using an ANg that is not the AN to which those NAS messages pertain.

For example, because the cells comprising the first AN 16 are associated with the tracking/location/routing area updates used by the communication network 12 for mobility management of a wireless device 20 operating in the communication network 12, the corresponding mobility-related NAS signaling messages sent to or received from the wireless device 20 may be understood as relating to mobility management of the wireless device 20 with respect to the first AN 16. Similarly, because session-management related NAS signaling exchanged with the wireless device 20 involves an access bearer or bearers provided via the first AN 16, even when such signaling is conditionally sent via the second AN 18, it still may be understood as relating to the session management of the wireless device 20 with respect to the first AN 16.

In an example embodiment, the network node 10 includes one or more communication interfaces 90 and a processing circuit 32, which may comprise fixed circuitry or programmed circuitry, such as computer circuitry, which may comprise one more microprocessor-based circuits, one or more DSP-based circuits, etc. In at least one embodiment, the node 10 is configured to perform any of the network-side methods taught herein based on the execution of a computer program 40 stored in a memory or other computer-readable medium 38 that is in or accessible to the processing circuit 32. It will also be understood that such circuitry may be configured to implement the various protocol layers described herein, including the Layer 3, NAS signaling at issue herein.

The example network node 10 further includes one or more communication interfaces 90 that communicatively couple the network node to the first and second ANs 16 and 18, respectively. As noted before, the CN 14 in an example case is a 3GPP CN and the first AN 16 is a 3GPP RAN. For example, the CN 14 is an EPC and the first AN 16 is an E-UTRAN, which function together as an EPS. In such an embodiment, the one or more communication interfaces 90 implemented in the network node 10 include a first communication interface 90-1, e.g. an S1-MME interface to one or more eNBs in the E-UTRAN, which is operative to exchange NAS signaling with a targeted wireless device 20 via the E-UTRAN. Advantageously, however, the network node 10 includes a second communication interface 90-2 that is operative to exchange at least a portion of the NAS signaling through a second AN 18 that is different from the E-UTRAN and is a non-3GPP AN. For example, the second AN 18 is a Wi-Fi-based AN, and the second communication interface 90-2 of the network node 10 comprises an Internet interface to send/receive IP packets encapsulating NAS signaling messages that relate to mobility and/or session management of the wireless device 20 with respect to the E-UTRAN.

In this regard, the processing circuit 32 of the network node 10 is configured to generate a NAS signaling message and map or otherwise translate it into one or more IP packets, for Internet-based transport to the second AN 18, which then transmits the information to the wireless device 20 according to the particulars of the air interface and associated protocols used by the second AN 18. Additionally, the processing circuit 32 of the network node 10 is configured to process IP packets received from the second AN 18 and extract the NAS signaling messages conveyed in them—i.e., NAS signaling messages generated at the wireless device 20 and packetized by the wireless device 20 for IP transport to the network node 10, via communication through the second AN 18.

In at least one embodiment, there is a secure connection, e.g., a dedicated transport tunnel, between the second AN 18 and the network node 10, or at least between the second AN 18 and the NAS server 24. Thereby, the IP traffic carrying the NAS signaling messages being exchanged between the network node 10 and the wireless device 20 is secured. Furthermore, the second AN 18 may know the IP address of the network node 10, e.g., the IP address of an MME in the EPC, and the network node 10 may know the address of a BNG or other routing entity in the second AN 18, and the IP traffic thus may be sent directly from the second AN 18 toward the network node 10, and from the network node 10 directly toward the second AN 18. On the other hand, because the CN 14 may be "closed" from the perspective of the public Internet, it is also contemplated herein to use the NAS server 24 in one or more embodiments, as an intermediate routing/forwarding entity.

In such embodiments, the network node 10 with its NAS client 26 is configured to send/receive one or more NAS signaling messages to/from a given wireless device 20 via the NAS server 24. For example, the network node 10 may be configured to send given NAS signaling to the wireless device 20 using the first AN 16, as is conventional, and, conditionally, to send other given NAS signaling to the wireless device 20 using the second AN 18, where this other given NAS signaling still pertains to mobility and/or session management of the wireless device 20 with respect to the first AN 16, i.e., in the context of the first AN 16. In such instances, the NAS client 26 at the network nodes 10 sends NAS signaling to the NAS server 24, which then sends corresponding, properly-addressed IP traffic on toward the second AN 18, or, for NAS signaling incoming from the wireless device 20 via the second AN 18, the NAS server receives such signaling and forwards it toward the network node 10. Note that the NAS client 26 can exchange such signaling with the NAS Server 24 using IP-based protocols or using proprietary protocols.

As those of ordinary skill in the art will appreciate, and as was noted for the network node 10 described by way of example above, the wireless device 20 may be implemented using fixed and/or programmed circuitry. In an example case, the wireless device 20 includes program memory or another computer-readable medium 74 that stores a computer program 80, the execution of which by the one or more processing circuits 72 of the wireless device 20 configures the wireless device 20 to operate according to the teachings herein.

At least functionally, the one or more processing circuits 72 of the wireless device 20 include the aforementioned NAS signaling processor 68, which is configured to exchange NAS signaling with the CN 14 of the communication network 12 using a second AN 18, where the NAS signaling relates to the first AN 16. To this end, the wireless device 20 implements the aforementioned NAS client 28, which communicates with the targeted network node 10 in the communication network 12 and/or with the NAS server 24. For example, a NAS signaling message sent from the NAS client 28 in the wireless device 20 goes to the NAS server 24, which then forwards it on to the targeted network node 10.

In some embodiments, the one or more processing circuits 72 of the wireless device 20 are configured to determine whether to send NAS signaling via the second AN 18 based on any one or more of the following: the type and/or amount of NAS signaling involved; whether such signaling corresponds to NAS signaling received from the CN 14 via the second AN 18 or corresponds to NAS signaling received from the CN 14 via the first AN 16; and whether such signaling, or other NAS signaling, was unsuccessfully sent previously via the second AN 18.

It is also contemplated herein that the wireless device 20 and the corresponding network node 10 are configured to use the second AN 18 in a default sense, at least for some types of NAS signaling, and at least in cases where a second AN 18 is available for offloading such NAS signaling from the first AN 16. Further, it is contemplated that the wireless device 20 and the corresponding network node 10 in one or more embodiments are configured to fall back to the first AN 16 for sending NAS signaling in instances where transmission of the NAS signaling via the second AN 18 is unsuccessful—e.g., after some timeout period expires without receiving some indication or acknowledgment of successful transmission via the second AN 18.

Thus, unlike prior art terminals and networks where NAS signaling that is associated with mobility and/or connectivity involving a first AN is exchanged exclusively using radio resources in that first AN, the teachings herein provide methods and apparatuses for exchanging at least some of that NAS signaling using a second AN that is different than the first AN. Use of the second AN offloads signaling from the first AN, and, at least for some types of second ANs, reduces power consumption in the targeted wireless devices involved in such signaling.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of Non-Access Stratum (NAS) signaling at a network node configured for operation in a communication network that includes a core network and a first access network, said method comprising:
   conditionally selecting a second access network for exchanging NAS signaling between the communication network and a targeted wireless device, wherein the second access network is different from the first access network and wherein the NAS signaling relates to mobility management or session management of the targeted wireless device with respect to the first access network;
   exchanging the NAS signaling with the targeted wireless device via the second access network, when the second access network is selected; and
   exchanging the NAS signaling with the targeted wireless device via the first access network, when the second access network is not selected.

2. The method of claim 1, wherein conditionally selecting the second access network comprises at least one of:
   selecting the second access network in dependence on availability of the second access network with respect to the targeted wireless device;
   selecting the second access network in dependence on an amount or type of the NAS signaling to be exchanged;
   selecting the second access network in dependence on a loading or activity level in the first access network with respect to a cell or service area in which the targeted wireless device is operating; and
   selecting the second access network in dependence on a device type of the targeted wireless device.

3. The method of claim 2, wherein conditionally selecting the second access network comprises selecting the second access network so that the NAS signaling is exchanged via the second access network rather than the first access network, if the amount of the NAS signaling to be exchanged exceeds a defined amount, or if an activity or loading level of the first access network exceeds a defined level in a cell or service area of the targeted wireless device.

4. The method of claim 1, wherein the network node includes a first communication interface for exchanging NAS signaling via the first access network and a second communication interface for exchanging NAS signaling via the second access network, and wherein exchanging the NAS signaling with the targeted wireless device via the second access network comprises exchanging the NAS signaling via the second communication interface rather than via the first communication interface.

5. A network node configured for operation in a communication network that includes a core network and a first access network, said network node comprising:
   a first communication interface configured for exchanging Non-Access Stratum (NAS) signaling between the communication network and a targeted wireless device via the first access network, wherein the NAS signaling relates to mobility management or session management of the targeted wireless device with respect to the first access network;
   a second communication interface configured for exchanging the NAS signaling between the communication network and the targeted device via a second access network that is different from the first access network; and
   a processing circuit operatively associated with the first and second communication interfaces and configured to:
      conditionally select the second access network for exchanging the NAS signaling between the communication network and the targeted wireless device;
      exchange the NAS signaling with the targeted wireless device via the second access network, when the second access network is selected; and
      exchange the NAS signaling with the targeted wireless device via the first access network, when the second access network is not selected.

6. The network node of claim 5, wherein the processing circuit is configured to conditionally select the second access network based on at least one of the following parameters:
   availability of the second access network with respect to the targeted wireless device;
   an amount or type of the NAS signaling to be exchanged;
   a loading or activity level in the first access network with respect to a cell or service area in which the targeted wireless device is operating; and
   a device type of the targeted wireless device.

7. The network node of claim 6, wherein the processing circuit is configured to conditionally select the second access network if the amount of the NAS signaling to be exchanged exceeds a defined amount, or if an activity or loading level of the first access network exceeds a defined level in a cell or service area of the targeted wireless device.

8. The network node of claim 5, wherein the processing circuit is configured to select the second access network by selecting the second communication interface for use in exchanging the NAS signaling and by performing processing of the NAS signaling as needed for exchange via the second access network.

9. A method of processing Non-Access Stratum (NAS) signaling in a wireless device operating in a communication network comprising a first access network and a core network, said method comprising:
   receiving incoming NAS signaling via a second access network that is different than the first access network but is communicatively linked directly or indirectly to the communication network, wherein the incoming NAS signaling relates to mobility management or session management of the wireless device with respect to the first access network;

extracting an incoming NAS message from the incoming NAS signaling and passing the incoming NAS message to a NAS processing layer of the wireless device; and processing the incoming NAS message via the NAS processing layer.

10. The method of claim 9, wherein the second access network is communicatively linked directly or indirectly to the communication network via an Internet Protocol (IP) network, and wherein receiving the incoming NAS signaling via the second access network comprises receiving one or more IP packets via the second access network, and wherein extracting the incoming NAS message from the incoming NAS signaling comprises extracting the incoming NAS message from the one or more IP packets.

11. The method of claim 10, wherein the incoming NAS message as conveyed in the one or more IP packets is encrypted, and wherein extracting the incoming NAS message from the one or more IP packets comprises decrypting the incoming NAS message before passing the incoming NAS message to the NAS processing layer of the wireless device.

12. The method of claim 9, wherein a NAS client in the wireless device performs said receiving the incoming NAS signaling and said extracting the incoming NAS message from the incoming NAS signaling, and wherein passing the incoming NAS message to the NAS processing layer comprises the NAS client passing the incoming NAS message to the NAS processing layer.

13. The method of claim 9, further comprising conditionally sending an outgoing NAS message to the communication network via the second access network rather than via the first access network.

14. A wireless device configured for operation in a communication network comprising a first access network and a core network, said wireless device comprising:
a first communication interface configured for operation with the first access network;
a second communication interface configured for operation with a second access network that is different than the first access network; and
one or more processing circuits operatively associated with the first and second communication interfaces and configured to:
receive incoming NAS signaling via the second access network, wherein the incoming NAS signaling relates to mobility management or session management of the wireless device with respect to the first access network;
extract an incoming NAS message from the incoming NAS signaling and pass the incoming NAS message to a NAS processing layer of the wireless device, as implemented in the one or more processing circuits; and
process the incoming NAS message via the NAS processing layer.

15. The wireless device of claim 14, wherein the second access network is communicatively linked directly or indirectly to the communication network via an Internet Protocol (IP) network, and wherein the incoming NAS signaling received via the second access network comprises one or more IP packets received via the second access network, and wherein the one or more processing circuits are configured to extract the incoming NAS message from the one or more IP packets.

16. The wireless device of claim 15, wherein the incoming NAS message as conveyed in the one or more IP packets is encrypted, and wherein the one or more processing circuits are configured to decrypt the incoming NAS message before passing the incoming NAS message to the NAS processing layer of the wireless device.

17. The wireless device of claim 14, wherein the one or more processing circuits are configured to implement a NAS client in the wireless device, and wherein the NAS client is configured to receive the incoming NAS signaling and extract the incoming NAS message from the incoming NAS signaling, and to pass the incoming NAS message to the NAS processing layer.

18. The wireless device of claim 14, wherein the one or more processing circuits are configured to conditionally send an outgoing NAS message to the communication network via the second access network, rather than via the first access network.

19. A Non-Access Stratum (NAS) server configured for operation in a communication network comprising a core network and a first access network, said NAS server comprising:
a communication interface configured for conveying NAS signaling exchanged between the communication network and a targeted wireless device via a second access network that is different than the first access network; and
one or more processing circuits operatively associated with the communication interface and configured to:
forward incoming NAS signaling, as sent from the targeted wireless device via the second access network, to a targeted network node within the first access network or within the core network, based on reading a node identifier included in the incoming NAS signaling; and
forward outgoing NAS signaling, as sent from the targeted network node for conveyance to the targeted wireless device via the second access network, towards the targeted wireless device via the second access network, based on maintaining a mapping between an identity of the targeted wireless device in the communication network and a routing address of the targeted wireless device in the second access network.

* * * * *